(12) United States Patent
Tsukuda et al.

(10) Patent No.: US 12,677,081 B2
(45) Date of Patent: Jul. 7, 2026

(54) APD SENSOR AND RANGING SYSTEM

(71) Applicant: SONY SEMICONDUCTOR SOLUTIONS CORPORATION, Kanagawa (JP)

(72) Inventors: Yasunori Tsukuda, Kanagawa (JP); Yuki Morikawa, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 627 days.

(21) Appl. No.: 18/248,693

(22) PCT Filed: Oct. 6, 2021

(86) PCT No.: PCT/JP2021/036933
§ 371 (c)(1),
(2) Date: Apr. 12, 2023

(87) PCT Pub. No.: WO2022/085448
PCT Pub. Date: Apr. 28, 2022

(65) Prior Publication Data
US 2023/0396898 A1 Dec. 7, 2023

(30) Foreign Application Priority Data
Oct. 23, 2020 (JP) ................................. 2020-178256

(51) Int. Cl.
*H04N 25/773* (2023.01)
*G01S 7/486* (2020.01)
(Continued)

(52) U.S. Cl.
CPC ........... *H04N 25/773* (2023.01); *G01S 7/486* (2013.01); *G01S 17/10* (2013.01); *G01S 17/89* (2013.01)

(58) Field of Classification Search
None
See application file for complete search history.

(56) References Cited

U.S. PATENT DOCUMENTS

| | | | | |
|---|---|---|---|---|
| 2020/0174105 A1* | 6/2020 | Yin | ........................ | G01S 7/4914 |
| 2020/0252563 A1* | 8/2020 | Gaalema | ............ | H03K 17/0416 |
| 2021/0051279 A1* | 2/2021 | Tochigi | .................. | H04N 25/53 |

FOREIGN PATENT DOCUMENTS

| | | |
|---|---|---|
| JP | 2019-192903 A | 10/2019 |
| JP | 2020-120175 A | 8/2020 |

(Continued)

OTHER PUBLICATIONS

International Search Report and Written Opinion of PCT Application No. PCT/JP2021/036933, issued on Dec. 14, 2021, 08 pages of ISRWO.

*Primary Examiner* — Luke D Ratcliffe
(74) *Attorney, Agent, or Firm* — CHIP LAW GROUP

(57) ABSTRACT

Provided are an avalanche photodiode (APD) sensor and a ranging system capable of counting, with high accuracy, a value relating to signals from a plurality of pixels with one counter. The APD according to the present disclosure includes a plurality of pixels each including an APD, a plurality of state detection circuits configured to detect states of a plurality of first signals output from the plurality of pixels and generate a plurality of second signals including detection results of the states of the plurality of first signals, a logical operation circuit configured to perform a logical operation on the plurality of second signals or a plurality of third signals that varies in a manner that depends on the plurality of second signals and generate a fourth signal including a result of the logical operation, and a counter configured to count a value relating to the plurality of first signals on the basis of the fourth signal, each of the state detection circuits having an input terminal to which the (Continued)

fourth signal is input, and input of each of the first signals to a corresponding one of the state detection circuits being disabled on the basis of the fourth signal input to the input terminal.

20 Claims, 19 Drawing Sheets

(51) Int. Cl.
    G01S 17/10           (2020.01)
    G01S 17/89           (2020.01)

(56)               References Cited

FOREIGN PATENT DOCUMENTS

| | | |
|---|---|---|
| JP | 2020-127122 A | 8/2020 |
| WO | 2019/150785 A1 | 8/2019 |

* cited by examiner

Figure 18:
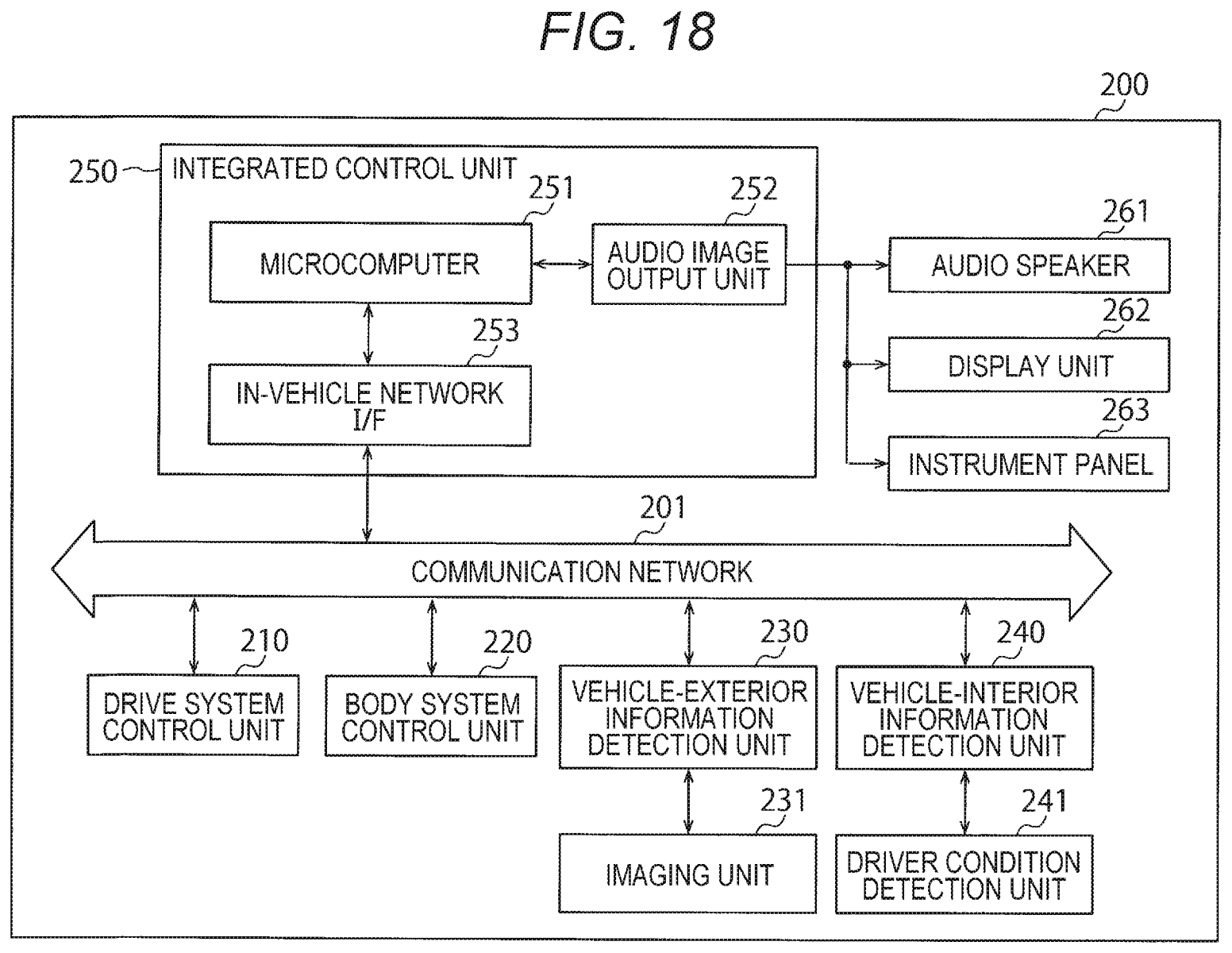

261　AUDIO SPEAKER

262　DISPLAY UNIT

263　INSTRUMENT PANEL

250　INTEGRATED CONTROL UNIT

252　AUDIO IMAGE OUTPUT UNIT

251　MICROCOMPUTER

253　IN-VEHICLE NETWORK I/F

201　COMMUNICATION NETWORK

240　VEHICLE-INTERIOR INFORMATION DETECTION UNIT

241　DRIVER CONDITION DETECTION UNIT

230　VEHICLE-EXTERIOR INFORMATION DETECTION UNIT

231　IMAGING UNIT

220　BODY SYSTEM CONTROL UNIT

210　DRIVE SYSTEM CONTROL UNIT

APD SENSOR AND RANGING SYSTEM

CROSS REFERENCE TO RELATED APPLICATIONS

This application is a U.S. National Phase of International Patent Application No. PCT/JP2021/036933 filed on Oct. 6, 2021, which claims priority benefit of Japanese Patent Application No. JP 2020-178256 filed in the Japan Patent Office on Oct. 23, 2020. Each of the above-referenced applications is hereby incorporated herein by reference in its entirety.

TECHNICAL FIELD

The present disclosure relates to an avalanche photodiode (APD) sensor and a ranging system.

BACKGROUND ART

A ranging system that performs distance measurement by a time of flight (ToF) method has recently attracted attention. Each pixel of such a ranging system includes, for example, an APD such as a single photon avalanche diode (SPAD) as a photoelectric converter. The SPAD causes avalanche amplification when one photon is received at a p-n junction in a state (Geiger mode) where a voltage higher than a breakdown voltage is applied. This causes an instantaneous current to flow through the SPAD. It is possible to measure a distance with high accuracy by detecting the timing at which the current flows.

CITATION LIST

Patent Document

Patent Document 1: Japanese Patent Application Laid-Open No.

SUMMARY OF THE INVENTION

Problems to be Solved by the Invention

In order to downsize a light receiving device in such a ranging system, it is desirable that values relating to signals from a plurality of pixels be counted by one counter. For example, the counter can count the number of photons received by the pixels or a light receiving time by counting the number of pulses included in the signals from the pixels or a generation time of the pulses. In this case, simultaneous input of the signals from the plurality of pixels to the counter causes a problem that the counter cannot correctly count the values.

The present disclosure therefore provides an APD sensor and a ranging system capable of counting, with high accuracy, values relating to signals from a plurality of pixels with one counter.

Solutions to Problems

An avalanche photodiode (APD) sensor according to a first aspect of the present disclosure includes a plurality of pixels each including an APD, a plurality of state detection circuits configured to detect states of a plurality of first signals output from the plurality of pixels and generate a plurality of second signals including detection results of the states of the plurality of first signals, a logical operation circuit configured to perform a logical operation on the plurality of second signals or a plurality of third signals that varies in a manner that depends on the plurality of second signals and generate a fourth signal including a result of the logical operation, and a counter configured to count a value relating to the plurality of first signals on the basis of the fourth signal, in which each of the state detection circuits has an input terminal to which the fourth signal is input, and input of each of the first signals to a corresponding one of the state detection circuits is disabled on the basis of the fourth signal input to the input terminal. This makes it possible to count, with high accuracy, a value relating to the signals from the plurality of pixels with one counter by controlling the operation of the state detection circuits using the fourth signal, for example.

Furthermore, the APD sensor according to the first aspect may further include a first substrate including a pixel array region having the plurality of pixels, and a second substrate bonded to the first substrate, the second substrate including the state detection circuits, the logical operation circuit, and the counter. This makes it possible to manufacture the APD sensor by bonding the first substrate and the second substrate together, for example.

Furthermore, according to the first aspect, the state detection circuits and at least a part of the logical operation circuit may be disposed so as to face the pixel array region, and the counter may be disposed so as not to face the pixel array region or be disposed in the pixel array region. This makes it possible to dispose the state detection circuits with the state detection circuits associated with the pixels and to dispose the part of the logical operation circuit with the part of the logical operation circuit associated with the pixels, for example.

Furthermore, according to the first aspect, the state detection circuits may be disposed so as to face the pixel array region, and at least a part of the logical operation circuit and the counter may be disposed so as not to face the pixel array region. This makes it possible to dispose the state detection circuits with the state detection circuits associated with the pixels and to dispose the part of the logical operation circuit with the part of the logical operation circuit not associated with the pixels, for example.

Furthermore, according to the first aspect, the APD may be a single photon avalanche diode (SPAD). This makes it possible to count a value relating to photons received by the plurality of pixels, for example.

Furthermore, according to the first aspect, the APD may have a cathode electrically connected to a corresponding one of the state detection circuits. This makes it possible to dispose the cathode of the APD adjacent to a current source or a buffer, for example.

Furthermore, according to the first aspect, the APD may have an anode electrically connected to a corresponding one of the state detection circuits. This makes it possible to dispose the anode of the APD adjacent to a current source or a buffer, for example.

Furthermore, according to the first aspect, the input terminal may be a reset terminal configured to reset a corresponding one of the state detection circuits. This makes it possible to count, with high accuracy, a value relating to the signals from the plurality of pixels with one counter by resetting the state detection circuits using the fourth signal, for example.

Furthermore, according to the first aspect, the state detection circuits may each detect an edge of a corresponding one of the first signals. This makes it easy to count, with high accuracy, a value relating to the signals from the plurality of pixels with one counter, for example.

Furthermore, according to the first aspect, the state detection circuits may each include a flip-flop circuit. This makes it easy to count, with high accuracy, a value relating to the signals from the plurality of pixels with one counter, for example.

Furthermore, according to the first aspect, the first signals may be each input to a clock terminal of the flip-flop circuit. This makes it possible to suitably use the flip-flop circuit as each state detection circuit, for example.

Furthermore, according to the first aspect, the state detection circuits may each detect a level of a corresponding one of the first signals. This makes it possible to easily detect the states of the signals from the plurality of pixels, for example.

Furthermore, according to the first aspect, the state detection circuits may each include a latch circuit. This makes it possible to easily detect the states of the signals from the plurality of pixels, for example.

Furthermore, according to the first aspect, each of the state detection circuits may further include an AND circuit or a NAND circuit configured to perform an AND operation or a NAND operation on two signals obtained from a corresponding one of the first signals, and input a signal indicating a result of the AND operation or the NAND operation to the latch circuit. This makes it possible to suitably use the latch circuit as each state detection circuit, for example.

Furthermore, according to the first aspect, the logical operation circuit may include a plurality of transistors configured to generate the plurality of third signals on the basis of the plurality of second signals. This makes it is possible to generate the third signals that vary in a manner that depends on the second signals.

Furthermore, according to the first aspect, the second signals may be each input to a control terminal of a corresponding one of the transistors, and the third signals may be each output from a main terminal of a corresponding one of the transistors (for example, a drain terminal or a source terminal of a MOS transistor). This makes it is possible to easily generate the third signals that vary in a manner that depends on the second signals.

Furthermore, according to the first aspect, the fourth signal may include a result of an AND operation, an OR operation, a NAND operation, or a NOR operation on the plurality of second signals or the plurality of third signals. This allows the signals from the plurality of pixels to converge into one signal, for example.

Furthermore, according to the first aspect, the logical operation circuit may include a wired AND circuit, a wired OR circuit, a wired NAND circuit, or a wired NOR circuit. This allows the signals from the plurality of pixels to converge into one signal with a simple circuit configuration, for example.

Furthermore, according to the first aspect, the logical operation circuit may include at least one of an AND gate, an OR gate, a NAND gate, or a NOR gate. This allows the signals from the plurality of pixels to converge into one signal using a logic gate, for example.

A ranging system according to a second aspect of the present disclosure includes a light emitting device configured to irradiate a subject with light, a light receiving device configured to receive light reflected off the subject, and a ranging device configured to measure a distance to the subject on the basis of the light received by the light receiving device, in which the light receiving device includes a plurality of pixels each including an avalanche photodiode (APD), the APD being configured to receive the light reflected off the subject, a plurality of state detection circuits configured to detect states of a plurality of first signals output from the plurality of pixels and generate a plurality of second signals including detection results of the states of the plurality of first signals, a logical operation circuit configured to perform a logical operation on the plurality of second signals or a plurality of third signals that varies in a manner that depends on the plurality of second signals and generate a fourth signal including a result of the logical operation, and a counter configured to count a value relating to the plurality of first signals on the basis of the fourth signal, each of the state detection circuits has an input terminal to which the fourth signal is input, and input of each of the first signals to a corresponding one of the state detection circuits is disabled on the basis of the fourth signal input to the input terminal. This makes it possible to count, with high accuracy, a value relating to the signals from the plurality of pixels with one counter by controlling the operation of the state detection circuits using the fourth signal, for example.

BRIEF DESCRIPTION OF DRAWINGS

FIG. 10 is a circuit diagram illustrating a configuration of an APD sensor according to a third embodiment.

FIG. 11 is a circuit diagram illustrating a configuration of an APD sensor according to a fourth embodiment.

FIG. 13 is a circuit diagram illustrating another configuration example of the state detection circuit according to the fourth embodiment.

FIG. 17 is a block diagram illustrating a configuration example of an electronic device.

FIG. 18 is a block diagram illustrating a configuration example of a mobile object control system.

MODE FOR CARRYING OUT THE INVENTION

Hereinafter, embodiments of the present disclosure will be described with reference to the drawings.

First Embodiment

Figure 1:
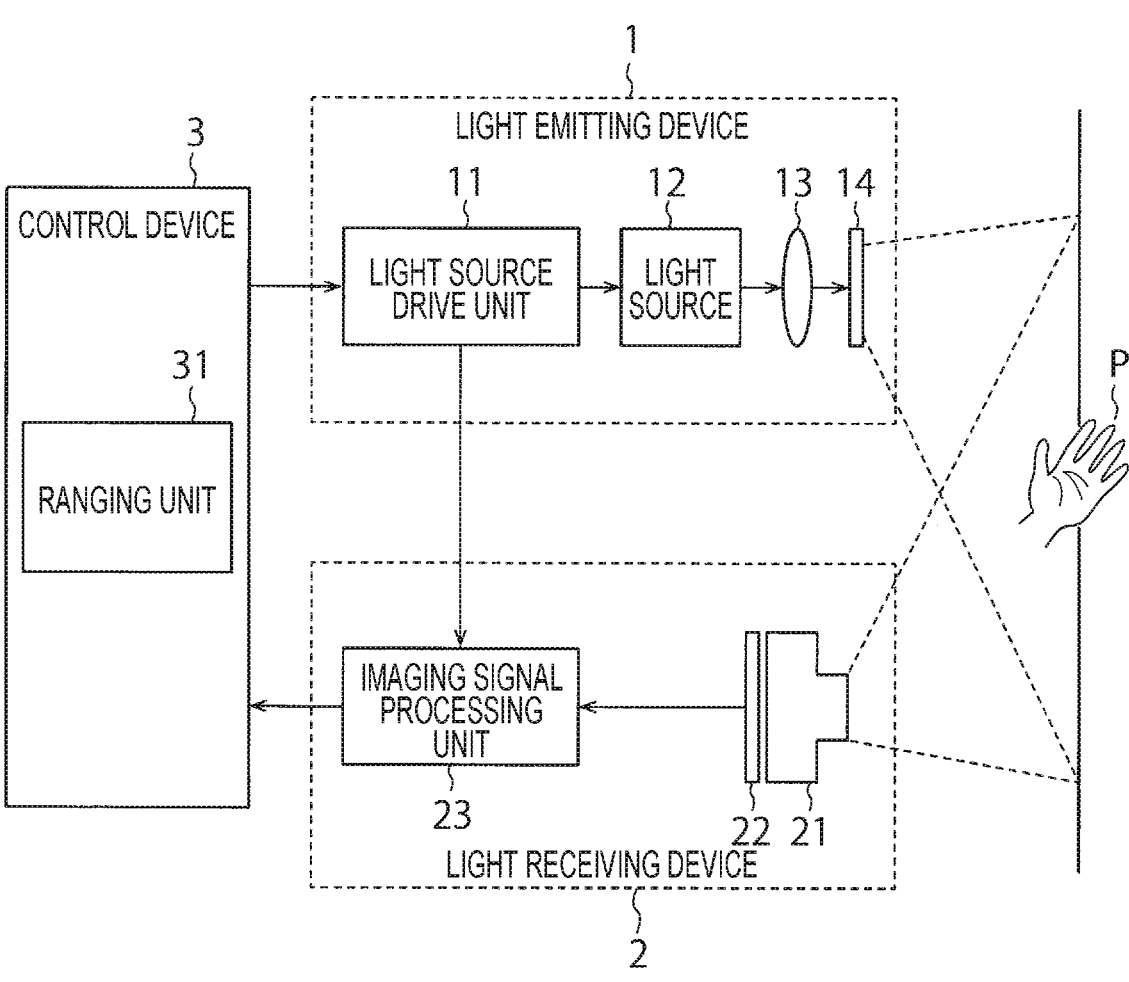
FIG. 1 is a block diagram illustrating a configuration of a ranging system according to a first embodiment.

FIG. 1 is a block diagram illustrating a configuration of a ranging system according to a first embodiment. The ranging system illustrated in FIG. 1 includes a light emitting device 1, a light receiving device 2, and a control device 3. The control device 3 is an example of a ranging device according to the present disclosure.

The light emitting device 1 includes a plurality of light emitting elements that generate light, and a subject P is irradiated with the light from the light emitting elements. The light receiving device 2 receives light reflected off the subject P. The control device 3 controls various operations of the ranging system illustrated in FIG. 1, and measures a distance to the subject P on the basis of, for example, the light received by the light receiving device 2. The ranging system illustrated in FIG. 1 is used to recognize, for example, a gesture performed by a human using his/her hand, but may be used for other purposes (for example, authentication of a human face).

The light emitting device 1 includes a light source drive unit 11, a light source 12, and a collimating lens 13, and may further include a diffractive optical element 14 in accordance with a requirement for the light receiving device 2. The light receiving device 2 includes a lens unit 21, an imaging unit 22, and an imaging signal processing unit 23. The control device 3 includes a ranging unit 31.

The light source drive unit 11 drives the light source 12 to cause the light source 12 to generate light. The light source 12 includes the above-described plurality of light emitting elements. The light source drive unit 11 according to the present embodiment drives the light emitting elements to cause the light emitting elements to generate light. Each light emitting element according to the present embodiment has, for example, a vertical cavity surface emitting laser (VCSEL) structure, and generates laser light. The light generated from the light source 12 is, for example, visible light or infrared rays.

The collimating lens 13 collimates the light from the light source 12. As a result, the light from the light source 12 becomes parallel light and is emitted toward the diffractive optical element 14. The diffractive optical element 14 diffracts the parallel light from the collimating lens 13. As a result, the parallel light from the collimating lens 13 becomes light having a desired pattern and is emitted from the light emitting device 1. The light emitting device 1 irradiates the subject P with the light (irradiation light) having a desired pattern. The pattern projected onto the subject P is also referred to as a projection image. The light with which the subject P is irradiated is reflected off the subject P and received by the light receiving device 2

The lens unit 21 includes a plurality of lenses, and causes the lenses to collect and condense light reflected off the subject P. Each of the lenses is covered with an antireflection film for preventing reflection of light. The antireflection film may serve as a band pass filter (BPF) that transmits light identical in wavelength to the light emitted from the light emitting device 1.

The imaging unit 22 captures an image of the light collected and condensed by the lens unit 21 and outputs an imaging signal obtained by the image capture. The imaging unit 22 is a solid-state imaging device such as a charge coupled device (CCD) image sensor or a complementary metal oxide semiconductor (CMOS) image sensor.

The imaging signal processing unit 23 performs predetermined signal processing on the imaging signal output from the imaging unit 22. For example, the imaging signal processing unit 23 performs various types of image processing on the image captured by the imaging unit 22. The imaging signal processing unit 23 outputs the imaging signal subjected to the above-described signal processing to the control device 3.

The control device 3 includes a processor, a memory, a storage, and the like for controlling various operations of the ranging system, and causes the ranging unit 31 to control, for example, distance measurement that is performed by the ranging system. For example, the ranging unit 31 controls the operation of the light source drive unit 11, and measures (calculates) the distance between the ranging system and the subject P on the basis of the imaging signal from the imaging signal processing unit 23. The distance measurement according to the present embodiment is performed by, for example, a time of flight (ToF) method, but may be performed by other methods.

Figure 2:
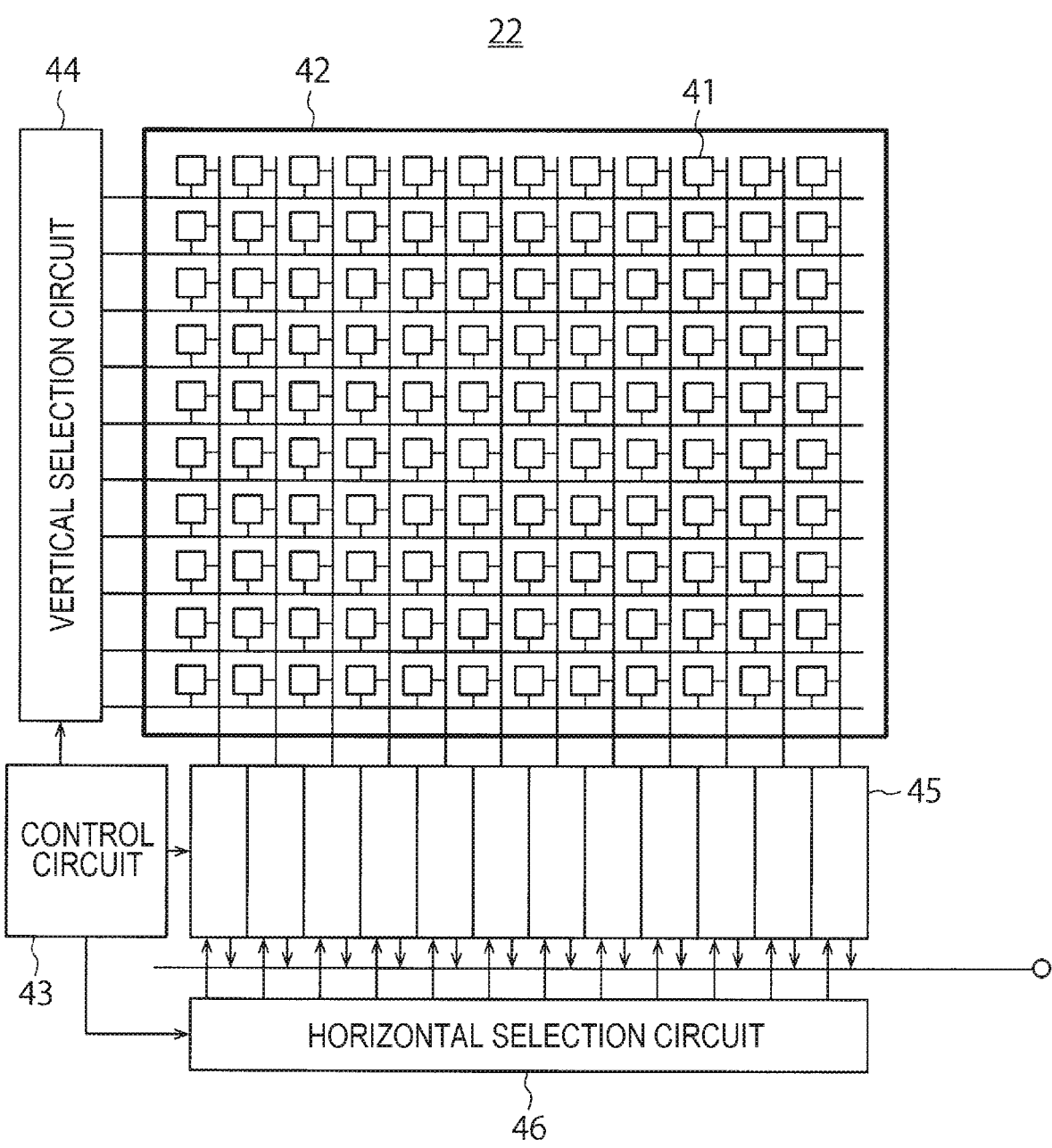
FIG. 2 is a block diagram illustrating a configuration of an imaging unit according to the first embodiment.

FIG. 2 is a block diagram illustrating a configuration of the imaging unit 22 according to the first embodiment.

The imaging unit 22 according to the present embodiment includes a pixel array region 42 having a plurality of pixels 41, a control circuit 43, a vertical selection circuit 44, a plurality of external pixel array signal processing circuits 45, a horizontal selection circuit 46, an output circuit 47, a plurality of vertical signal lines 48, and a plurality of horizontal signal lines 49. The imaging unit 22 according to the present embodiment is, for example, a SPAD sensor.

Each pixel 41 includes a photodiode functioning as a photoelectric converter. An example of the photodiode is an APD such as a SPAD.

The pixel array region 42 has the plurality of pixels 41 arranged in a two-dimensional array. The pixel array region 42 includes an effective pixel region that performs, upon receipt of light, photoelectric conversion and outputs a signal charge generated by the photoelectric conversion.

The control circuit 43 generates, on the basis of a vertical sync signal, a horizontal sync signal, a master clock, and the like, various signals on the basis of which the vertical selection circuit 44, the external pixel array signal processing circuit 45, the horizontal selection circuit 46, and the like operate. The signals are, for example, a clock signal and a control signal, and are input to the vertical selection circuit 44, the external pixel array signal processing circuit 45, the horizontal selection circuit 46, and the like.

The vertical selection circuit 44 and the horizontal selection circuit 46 set effective pixels from the pixels 41 of the pixel array region 42. The vertical selection circuit 44 and the horizontal selection circuit 46 further supply reaction time information read by each pixel 41 to the external pixel array signal processing circuit 45 through a signal read line 48.

The external pixel array signal processing circuit 45 calculates a distance on the basis of reaction timing information obtained by the pixels 41.

Figure 3:
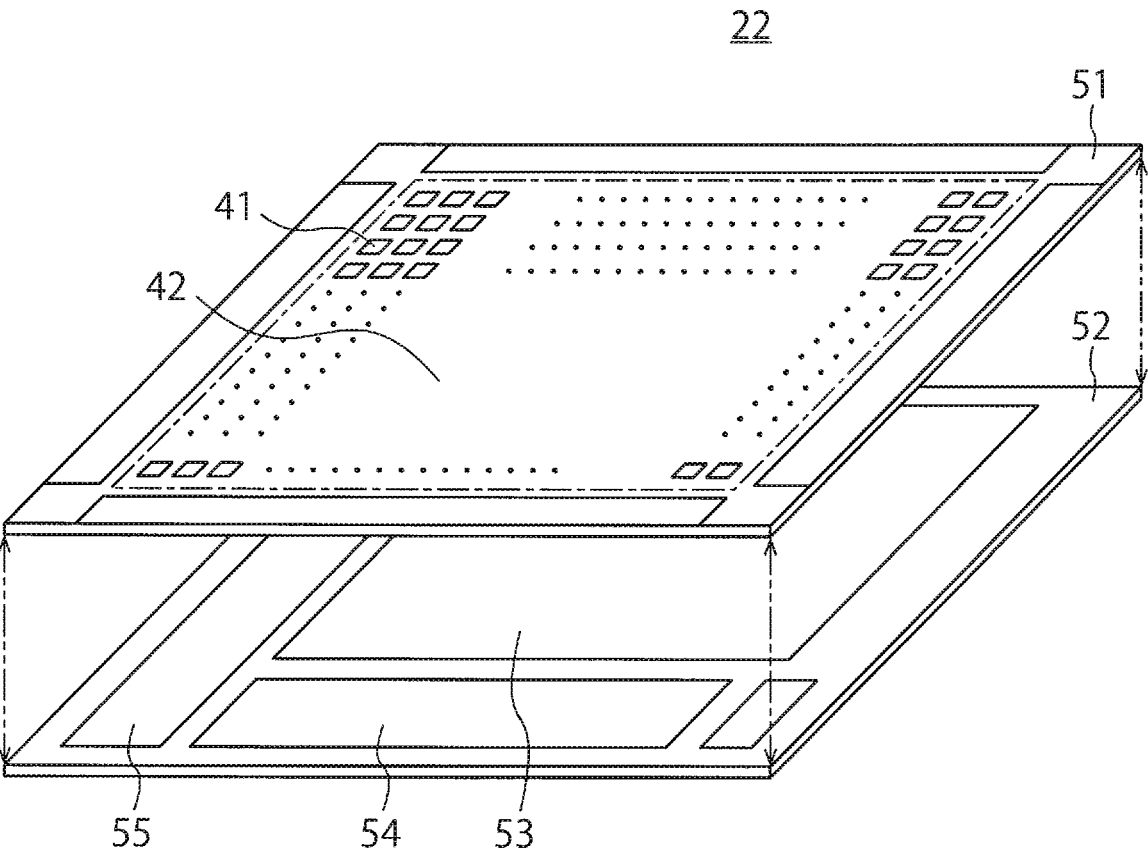
FIG. 3 is a perspective view of the configuration of the imaging unit according to the first embodiment.

FIG. 3 is a perspective view of the configuration of the imaging unit 22 according to the first embodiment.

The imaging unit 22 according to the present embodiment includes a light receiving substrate 51 and a logic substrate 52 that are bonded together. Specifically, the imaging unit 22 according to the present embodiment is made as follows: various layers are provided on a semiconductor substrate for the light receiving substrate 51, various layers are provided on a semiconductor substrate for the logic substrate 52, the semiconductor substrates are bonded together with the layers interposed between the semiconductor substrates, and the semiconductor substrates after the bonding are divided into a plurality of chips. Note that at least one of the semiconductor substrates may be removed or made thinner after the bonding in order to reduce a thickness of each chip, for example. Furthermore, at least one of the semiconductor substrates may be a substrate other than the semiconductor substrate. In FIG. 3, the light receiving substrate 51 is disposed on the logic substrate 52. The light receiving substrate 51 and the logic substrate 52 are examples of a first substrate and a second substrate according to the present disclosure, respectively.

The light receiving substrate 51 includes the above-described pixel array region 42. As described above, the pixel array region 42 has the plurality of pixels 41 arranged in a two-dimensional array. The pixel array region 42 receives light collected and condensed by the lens unit 21 (see FIG. 1). The imaging unit 22 captures an image of this light and outputs an imaging signal obtained by the image capture to the imaging signal processing unit 23 (see FIG. 1).

The logic substrate 52 includes a logic array unit 53, a signal processing unit 54, and an imaging control unit 55. The logic array unit 53 includes a plurality of logic circuits corresponding to the plurality of pixels 41 described above, and each of the logic circuits processes a signal output from a corresponding pixel 41. The signal processing unit 54 processes the plurality of signals output from the logic circuits. For example, the signal processing unit 54 performs a logical operation on the signals or counts the number of pulses included in the signals. The imaging control unit 55 controls various operations of the imaging unit 22. The imaging control unit 55 includes, for example, the control circuit 43, the vertical selection circuit 44, the external pixel array signal processing circuit 45, and the horizontal selection circuit 46 illustrated in FIG. 1.

According to the present embodiment, the logic array unit 53 is disposed so as to cause the most part of the logic array unit 53 to face the pixel array region 42, and the signal processing unit 54 and the imaging control unit 55 are disposed so as to prevent the most part of the signal processing unit 54 and the most part of the imaging control unit 55 from facing the pixel array region 42. Therefore, the logic array unit 53 is disposed so as to place the most part of logic array unit 53 over the pixel array region 42 in the vertical direction in FIG. 3, and the signal processing unit 54 and the imaging control unit 55 are disposed so as to prevent the most part of the signal processing unit 54 and the most part of the imaging control unit 55 from being placed over the pixel array region 42 in the vertical direction in FIG. 3.

As will be described later, the imaging unit 22 according to the present embodiment includes a plurality of state detection circuits 61, a logical operation circuit 62, and a time to digital counter (TDC) 63 (see FIG. 4). The state detection circuits 61 are disposed, for example, in the logic array unit 53 so as to face the pixel array region 42. On the other hand, for example, the TDC 63 is disposed in the signal processing unit 54 so as not to face the pixel array region 42. The logical operation circuit 62 may be disposed in either the logic array unit 53 or the signal processing unit 54, that is, may be disposed so as to face or not to face the pixel array region 42. Furthermore, the logical operation circuit 62 may be disposed across the logic array unit 53 and the signal processing unit 54, or may be disposed across the position facing the pixel array region 42 and the position not facing the pixel array region 42. Note that the TDC 63 may be disposed in the pixel array region 42 rather than in the signal processing unit 54. Further details of the state detection circuits 61, the logical operation circuit 62, and the TDC 63 will be described later.

Note that the imaging signal processing unit 23 illustrated in FIG. 1 may be included in the logic substrate 52, and, for example, may be included in the signal processing unit 54 or the imaging control unit 55.

Figure 4:
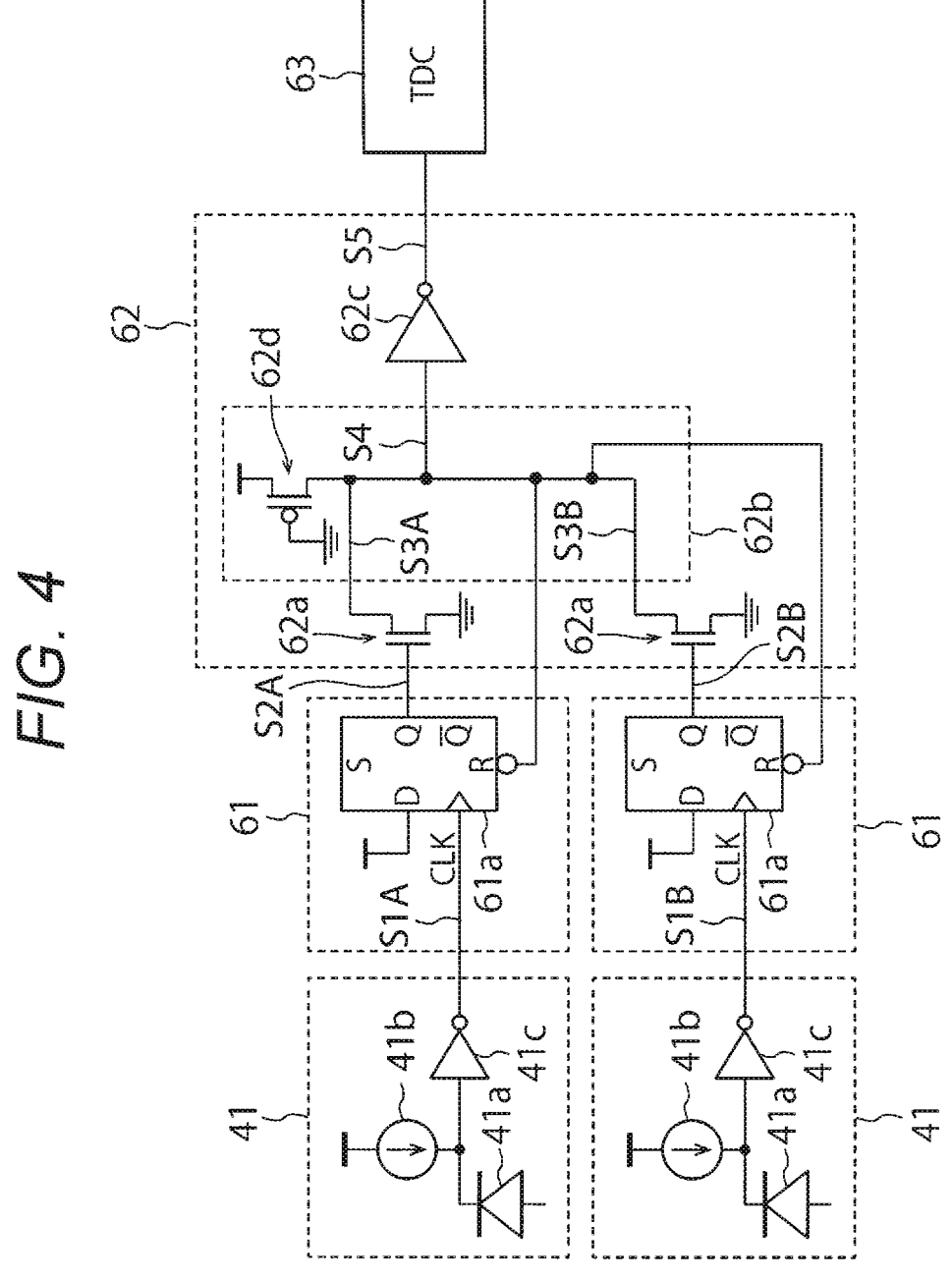
FIG. 4 is a circuit diagram illustrating a configuration of an APD sensor according to the first embodiment.

FIG. 4 is a circuit diagram illustrating a configuration of the APD sensor according to the first embodiment.

The imaging unit 22 according to the present embodiment includes an APD sensor having the configuration illustrated in FIG. 4. As illustrated in FIG. 4, the APD sensor according to the present embodiment includes the plurality of pixels 41, the plurality of state detection circuits 61, the logical operation circuit 62, and the TDC 63. Each pixel 41 includes an APD 41a, a current source 41b, and an inverter 41c. Each state detection circuit 61 includes a D flip-flop (DFF) circuit 61a. FIG. 4 illustrates a clock (CLK) terminal, a D terminal, a Q terminal, a QB (/Q) terminal, a set(S) terminal, and a reset (R) terminal of the DFF circuit 61a. The logical operation circuit 62 includes a plurality of transistors 62a, a wired NOR circuit 62b, and a NOT gate 62c, and the wired NOR circuit 62b includes a transistor 62d. TDC 63 is an example of a counter according to the present disclosure.

FIG. 4 illustrates two pixels 41 as examples of the plurality of pixels 41 included in the APD sensor according to the present embodiment. Each pixel 41 has a cathode of the APD 41a electrically connected to the current source 41b and the inverter 41c, and is electrically connected to a corresponding state detection circuit 61 via the inverter 41c. Note that the number of pixels 41 included in the APD sensor according to the present embodiment may be other than two.

The APD 41a performs photoelectric conversion upon receipt of light collected and condensed by the lens unit 21 (FIG. 1) and outputs a signal charge generated by the photoelectric conversion. The APD 41a according to the present embodiment is, for example, a SPAD, and causes avalanche amplification when one photon is received at a p-n junction in a state (Geiger mode) where a voltage higher than a breakdown voltage is applied. This causes an instantaneous current to flow through the APD 41a. As a result, a signal including a pulse is output from each pixel 41 to a corresponding state detection circuit 61. FIG. 4 illustrates a signal S1A output from one of the two pixels 41 and a signal S1B output from the other of the two pixels 41. The signals S1A, S1B are examples of a first signal. Note that the APD 41a may be a photodiode other than the SPAD.

The current source 41b and the inverter 41c function as a read circuit of a corresponding pixel 41. The current source 41b supplies a constant current to the APD 41a to charge the APD 41a. The inverter 41c inverts and amplifies the signal from the APD 41a, and outputs the signal S1A (or S1B) to a corresponding state detection circuit 61.

The APD sensor according to the present embodiment includes the state detection circuits 61 whose number is the same as the number of pixels 41. Therefore, FIG. 4 illustrates two state detection circuits 61 as examples of the plurality of state detection circuits 61 included in the APD sensor according to the present embodiment. Each state detection circuit 61 has the CLK terminal of the DFF circuit 61a electrically connected to a corresponding pixel 41, and has the Q terminal and the R terminal of the DFF circuit 61a electrically connected to the logical operation circuit 62. The DFF circuit 61a is an example of a flip-flop circuit according to the present disclosure, and the R terminal is an example of an input terminal according to the present disclosure.

Each state detection circuit 61 detects a state of the signal S1A (or S1B) output from a corresponding pixel 41, and generates a signal S2A (or S2B) including a detection result of the state of the signal S1A (or S1B). FIG. 4 illustrates the signal S2A output from one of the two state detection circuits 61 and the signal S2B output from the other of the two state detection circuits 61. The signals S2A, S2B are examples of a second signal.

The signal S1A is input to the CLK terminal of one of the DFF circuits 61a. The DFF circuit 61a detects an edge of the signal S1A and generates the signal S2A including a detection result of the edge of the signal S1A. For example, when a value of the signal S1A rises from logic 0 to logic 1, a value of the signal 2A changes from logic 0 or logic 1 to the other. The signal 2A is output from the Q terminal of the DFF circuit 61a. The same applies to the signal S1B. Specifically, the other of the DFF circuits 61a detects an edge of the signal S1B and generates the signal S2B including a detection result of the edge of the signal S1B.

The logical operation circuit 62 according to the present embodiment includes the transistors 62a whose number is the same as the number of pixels 41. Therefore, FIG. 4 illustrates two transistors 62a as examples of the plurality of transistors 62a included in the logical operation circuit 62 according to the present embodiment. Each transistor 62a is, for example, a MOS transistor, and has a gate terminal electrically connected to the Q terminal of a corresponding state detection circuit 61. Furthermore, each transistor 62a has one of a source terminal or a drain terminal electrically connected to the wired NOR circuit 62b, and has the other of the source terminal or the drain terminal electrically connected to ground wiring. The gate terminal is an example of a control terminal according to the present disclosure, and the source terminal or the drain terminal is an example of a main terminal according to the present disclosure. Each transistor 62a according to the present embodiment is an nMOS, but may be a pMOS.

The signal S2A is input to the gate terminal of one of the transistors 62a. When the signal S2A having a predetermined value is input to the gate terminal, the transistor 62a outputs a drain current from the drain terminal. As a result, a signal S3A that varies in a manner that depends on the signal S2A is output from the source terminal or the drain terminal of the transistor 62a to the wired NOR circuit 62b. The same applies to the signal S2B. Specifically, a signal S3B that varies in a manner that depends on the signal S2B is output from the source terminal or the drain terminal of the other of the transistors 62a to the wired NOR circuit 62b. The signals S3A, S3B are examples of a third signal.

The wired NOR circuit 62b includes wiring that electrically connects the transistors 62a and the NOT gate 62c, and the transistor 62d disposed between the wiring and power supply wiring. The transistor 62d is, for example, a MOS transistor, and the transistor 62d has a gate terminal electrically connected to the ground wiring. Furthermore, the transistor 62d has one of a source terminal or a drain terminal electrically connected to the power supply wiring, and has the other of the source terminal or the drain terminal electrically connected to each transistor 62a and the NOT gate 62c. The transistor 62d according to the present embodiment is a pMOS having the gate terminal electrically connected to the ground wiring, but may be an nMOS having the gate terminal electrically connected to the power supply wiring.

The wired NOR circuit 62b performs a logical operation on the signal S3A and the signal S3B to generate a signal S4 including a result of the logical operation. The wired NOR circuit 62b performs a NOR operation on the signal S3A and the signal S3B, so that the signal S4 includes a result of the NOR operation. The signal S4 is output from the wired NOR circuit 62b to the NOT gate 62c. The signal S4 is an example of a fourth signal according to the present disclosure.

According to the present embodiment, the use of the wired NOR circuit 62b allows the signal S3A and the signal S3B to converge into the signal S4. In general, the wired NOR circuit 62b can be implemented with a simple circuit configuration as compared with the NOR gate. Therefore, according to the present embodiment, the use of the wired NOR circuit 62b allows the signal S3A and the signal S3B to converge into the signal S4 with a simple circuit configuration. Note that the logical operation circuit 62 according to the present embodiment may include a wired AND circuit, a wired OR circuit, or a wired NAND circuit rather than the wired NOR circuit 62b.

As described above, the transistor 62a according to the present embodiment is an nMOS, and the transistor 62d according to the present embodiment is a pMOS. In general, the nMOS is higher in driving force than the pMOS. Therefore, according to the present embodiment, the nMOS is used as the transistor 62a located upstream of the wired NOR circuit 62b, and the pMOS is used as the transistor 62d serving as a load of the wired NOR circuit 62b, thereby allowing not only an increase in operation throughput of the wired NOR circuit 62b but also a reduction in area of the wired NOR circuit 62b. In general, the wired NOR circuit 62b is often large in load capacitance and often operates slowly. The present embodiment, however, allows an increase in operation throughput of the wired NOR circuit 62b as described above. This makes it possible to reduce a variation in delay times of the signals S3A, S3B, and to reduce an error in distance measurement.

The NOT gate 62c performs a NOT operation on the signal S4 to generate a signal S5 including a result of the NOT operation. Therefore, the wired NOR circuit 62b and the NOT gate 62c function as an OR circuit that performs an OR operation on the signal S3A and the signal S3B to generate the signal S5 including a result of the OR operation. The NOT gate 62c is also referred to as an inverter. The signal S5 is output from the NOT gate 62c to the TDC 63. The signal S5 is also an example of the fourth signal according to the present disclosure.

The APD sensor according to the present embodiment includes one TDC 63 corresponding to the plurality of pixels 41. Therefore, FIG. 4 illustrates one TDC 63 corresponding to the two pixels 41. The TDC 63 is electrically connected to the NOT gate 62c.

The TDC 63 can count a value relating to the signal S1A and the signal S1B by counting a value relating to the signal S5. Specifically, the TDC 63 counts a time from a predetermined timing to a timing at which the value of the signal S5 changes from logic 0 to logic 1, and outputs the time thus counted as a digital value. Therefore, the TDC 63 can count a time when the value of the signal S1A changes from logic 0 to logic 1 and a time when the value of the signal S1B changes from logic 0 to logic 1. That is, the TDC 63 can count a time when each pixel 41 of the APD sensor according to the present embodiment receives one photon. The ranging system according to the present embodiment measures the distance to the subject P (FIG. 1) on the basis of the digital value output from the TDC 63. Note that the TDC 63 may be replaced with a counter other than the TDC 63.

The TDC 63 according to the present embodiment can count the light receiving time of the photon indicated by the signal S1A and the light receiving time of the photon indicated by the signal S1B by handling the signal S5. This allows the signals S1A, S1B from the plurality of pixels 41 to be handled by one TDC 63 and thus allows a reduction in size of the imaging unit 22 and the light receiving device 2 illustrated in FIG. 1.

The case where the signals S1A, S1B are handled by one TDC 63, however, raises a possibility that a pulse width between a change in the signal S1A and a change in the signal S1B cannot satisfy a minimum pulse width that can ensure the normal operation of the TDC 63. For example, when the value of the signal S1A and the value of the signal S1B change from logic 0 to logic 1 at the same timing or at almost the same timing, there is a possibility that the TDC 63 erroneously acquires a timing value different from the original timing when a signal having continuous pulses of such changes is input.

Therefore, the APD sensor according to the present embodiment feeds back the signal S4 to each state detection circuit 61 in order to prevent the occurrence of such an error. The signal S4 thus fed back is input to the R terminal of each DFF circuit 61a. As a result, each DFF circuit 61a is asynchronously reset.

Further details of the R terminal of each DFF circuit 61a will be described below with reference to FIG. 4.

Each DFF circuit 61a is reset when the value of the signal S4 input to the R terminal changes from logic 1 to logic 0. Specifically, when a certain DFF circuit 61a is reset, the value of the signal S2A (or S2B) output from the Q terminal of the DFF circuit 61a is reset to logic 0. For example, when the value before the reset is logic 1, the value after the reset changes from logic 1 to logic 0. On the other hand, when the value before the reset is logic 0, the value after the reset remains at logic 0.

When the values of the signals S2A, S2B are both logic 0, the values of the signals S3A, S3B become both logic 0, and the value of the signal S4 become logic 1 that is a result of the NOR operation on the signals S3A, S3B. In this case, when any one of the pixels 41 illustrated in FIG. 4 receives a photon, the value of the signal S1A or the signal S1B changes to logic 1, and the value of the signal S2A or the signal S2B changes to logic 1. As a result, the value of the signal S3A or the signal S3B changes to logic 1, and the value of the signal S4 changes to logic 0.

As described above, when any one of the pixels 41 illustrated in FIG. 4 receives a photon, the value of the signal S4 changes to logic 0. As a result, each DFF circuit 61a is reset, and the values of the signals S2A, S2B both become logic 0. Therefore, in the APD sensor according to the present embodiment, when any one of the pixels 41 illustrated in FIG. 4 receives a photon, each DFF circuit 61a is reset in a propagation delay time of the signal S4 and a reset propagation delay time of each DFF circuit 61a. This allows, when any one of the pixels 41 illustrated in FIG. 4 receives a photon, the APD sensor according to the present embodiment to return to a state where the next photon can be detected after the end of a reset period having a predetermined length.

According to the present embodiment, when each DFF circuit 61a is reset, even if the value of the signal S1A or the value of the signal S1B further changes from logic 0 to logic 1 within a predetermined period, the values of the signals S2A, S2B both remain at logic 0. This makes it possible to prevent the TDC 63 from malfunctioning due to light reception while the TDC 63 converts the light receiving time of a certain photon into a digital value. Therefore, according to the present embodiment, even if the value of the signal S1A and the value of the signal S1B change from logic 0 to logic 1 at almost the same timing, it is possible to prevent the occurrence of the error as described above.

As described above, the APD sensor according to the present embodiment can disable the input of the signal S1A (or S1B) to a corresponding DFF circuit 61a by resetting the DFF circuit 61a using the signal S4. That is, regardless of the values of the signals S1A, S1B, the values of the signals S2A, S2B can both be logic 0.

In a case where the signal S4 is not input to the R terminal of each DFF circuit 61 a, if the value of the signal S1A and the value of the signal S1B change from logic 0 to logic 1 at almost the same timing, there is a high possibility that the value of the signal S2B transitions from logic 0 to logic 1 immediately after the value of the signal S2A transitions from logic 1 to logic 0. In this case, a time interval at which the respective values of the signals S3A, S3B change becomes shorter, the logical value of the signal S4 toggles in a short time, and a signal having a glitch with a width less than a minimum allowable pulse width for the TDC 63 appears in the signal S5. When the TDC 63 receives such a signal S5, the normal operation cannot be ensured, and an error that wrong light receiving time information is obtained occurs accordingly. On the other hand, according to the present embodiment, inputting the signal S4 to the R terminal of each DFF circuit 61a makes it possible to prevent the occurrence of such an error.

Note that each DFF circuit 61a according to the present embodiment may employ positive logic that causes the DFF circuit 61a to be reset when the signal 4 changes from logic 0 to logic 1, rather than negative logic that causes the DFF circuit 61a to be reset when the signal S4 changes from logic 1 to logic 0. Further, the APD sensor according to the present embodiment may input the signal S4 to an S terminal of each DFF circuit 61 rather than the R terminal of each DFF circuit 61a. Even in such cases, it is possible to implement the APD sensor capable of preventing the occurrence of the error as described above.

Figures 5, 6:
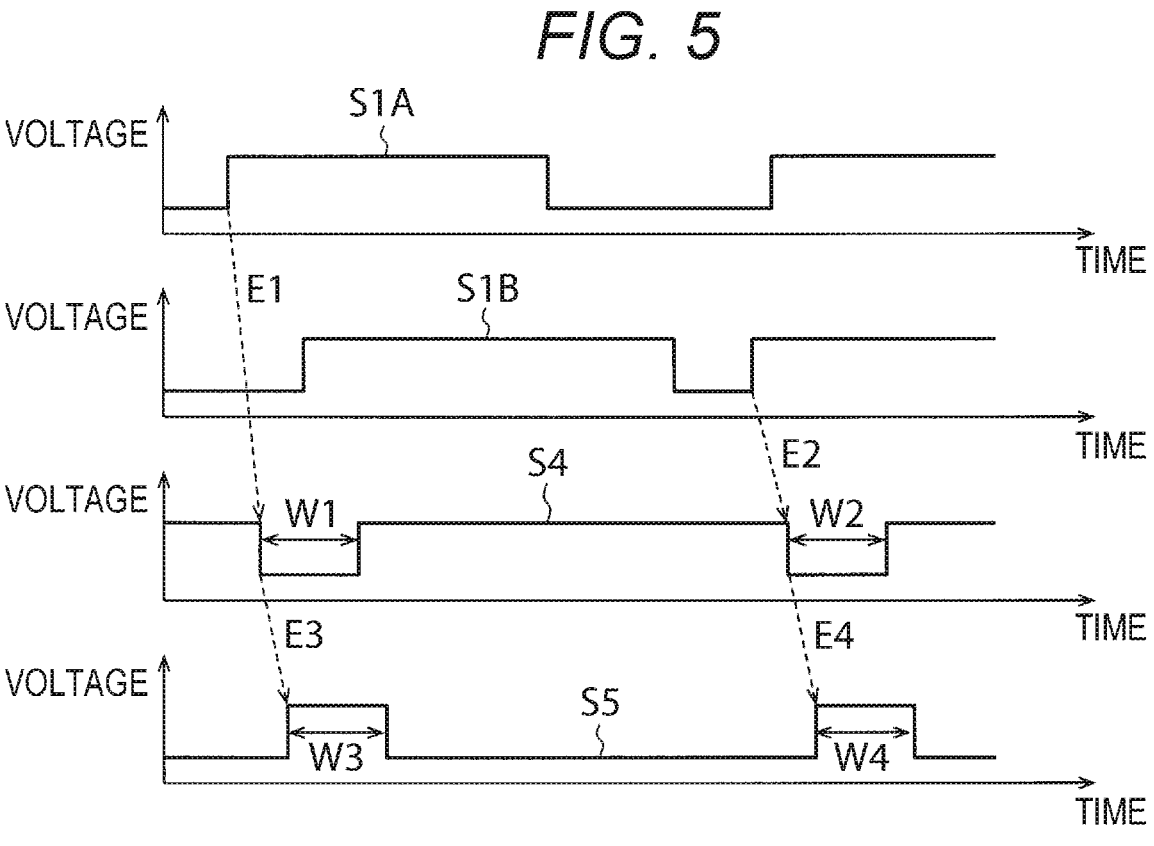
FIG. 5 is a timing chart illustrating an operation example of the APD sensor according to the first embodiment.
FIG. 6 is a circuit diagram illustrating a configuration of an APD sensor according to a comparative example of the first embodiment.

FIG. 5 is a timing chart illustrating an operation example of the APD sensor according to the first embodiment. FIG. 5 illustrates changes over time in signals S1A, S1B, S4, S5 illustrated in FIG. 4.

As indicated by an arrow E1, when one of the pixels 41 receives a photon, the value of the signal S1A changes from logic 0 to logic 1, and the value of the signal S4 changes from logic 1 to logic 0. Moreover, the value of the signal S5 changes from logic 0 to logic 1 (arrow E3). When the value of the signal S4 changes from logic 1 to logic 0, each DFF circuit 61a is reset as described above. As a result, even when the value of the signal S1A and/or the value of the signal S1B further changes from logic 0 to logic 1 within the predetermined period, the values of the signals S2A, S2B both remains at logic 0. After a lapse of a time W1 from the change indicated by the arrow E1, the value of the signal S4 returns from logic 0 to logic 1. Furthermore, after a lapse of a time W3 from the change indicated by the arrow E3, the value of the signal S5 returns from logic 1 to logic 0. This makes it possible to prevent the TDC 63 from malfunctioning due to light reception while the TDC 63 converts the light receiving time of a certain photon into a digital value.

As indicated by an arrow E2, when the other of the pixels 41 receives a photon, the value of the signal S1B changes from logic 0 to logic 1, and the value of the signal S4 changes from logic 1 to logic 0. Moreover, the value of the signal S5 changes from logic 0 to logic 1 (arrow E4). When the value of the signal S4 changes from logic 1 to logic 0, each DFF circuit 61a is reset as described above. As a result, even when the value of the signal S1A and/or the value of the signal S1B further changes from logic 0 to logic 1 within the predetermined period, the values of the signals S2A, S2B both remains at logic 0. After a lapse of a time W2 from the change indicated by the arrow E2, the value of the signal S4 returns from logic 0 to logic 1. Furthermore, after a lapse of a time W4 from the change indicated by the arrow E4, the value of the signal S5 returns from logic 1 to logic 0. This makes it possible to prevent the TDC 63 from malfunctioning due to light reception while the TDC 63 converts the light receiving time of a certain photon into a digital value.

Note that the signal S1B illustrated in FIG. 5 includes two pulses. The first pulse of the signal S1B occurs while the signal S4 is logic 0, so that the TDC 63 cannot detect the first pulse. On the other hand, the second pulse of the signal S1B occurs after the signal S4 returns to the logic 1, so that the TDC 63 can detect the second pulse. As described above, the APD sensor according to the present embodiment cannot detect a photon received before the lapse of the time W1 (or W2) from the start of reset, but can detect a photon received after the lapse of the time W1 (or W2) from the start of reset. According to the present embodiment, making the time W1 and the time W2 shorter allows a reduction in possibility of the occurrence of the error as described above. The time W1 and the time W2 each correspond to an input disabled period during which the input of the signal S1A (or S1B) to each DFF circuit 61a is disabled.

FIG. 6 is a circuit diagram illustrating a configuration of an APD sensor according to a comparative example of the first embodiment.

As illustrated in FIG. 6, the APD sensor according to the present comparative example includes a plurality of pixels 41, a plurality of state detection circuits 61', a logical operation circuit 62', and a TDC 63. The pixels 41 and the TDC 63 according to the present comparative example are identical in configuration to the pixels 41 and the TDC 63 according to the first embodiment, respectively. On the other hand, the state detection circuits 61' and the logical operation circuit 62' according to the present comparative example are different in configuration from the state detection circuits 61 and the logical operation circuit 62 according to the first embodiment, respectively. The pixels 41, the state detection circuits 61', and the logical operation circuit 62' according to the present comparative example output signals S1A, S1B, signals S6A, S6B, and a signal S7, respectively.

Each state detection circuit 61' according to the present comparative example includes, for example, a DFF circuit 61a that is the same as the DFF circuit 61a of each state detection circuit 61 according to the first embodiment, but the signal S4 is not input to the R terminal of each state detection circuit 61. Furthermore, the logical operation circuit 62' according to the present comparative example includes, for example, a transistor 62a, a wired NOR circuit 62b, and a NOT gate 62c that are the same as the transistor 62a, the wired NOR circuit 62b, and the NOT gate 62c of the logical operation circuit 62 according to the first embodiment, but the signals S6A, S6B rather than the signal S4 are input to the R terminals of one and the other of the state detection circuits 61, respectively. In this case, the signals S6A, S6B, S7 according to the present comparative example correspond to the signals S2A, S2B, S5 according to the first embodiment, respectively. Hereinafter, a timing chart of this case will be described with reference to FIG. 7.

Figure 7:
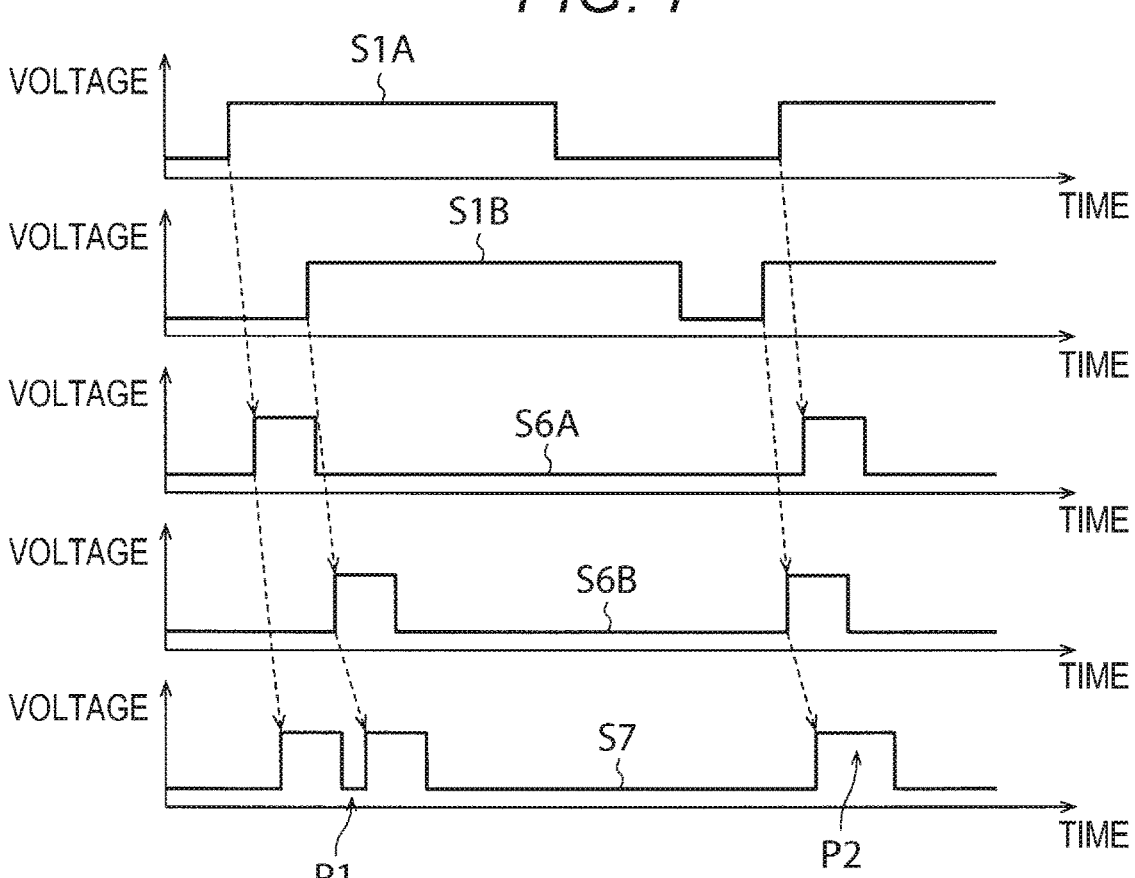
FIG. 7 is a timing chart illustrating an operation example of the APD sensor according to the comparative example.

FIG. 7 is a timing chart illustrating an operation example of the APD sensor according to the comparative example. FIG. 7 illustrates changes over time in signals S1A, S1B, S6A, S6B, S7 illustrated in FIG. 6.

As indicated by an arrow P1, when one and the other of the pixels 41 receive a photon at almost the same timing, the values of the signals S1A, S1B change from logic 0 to logic 1, the values of the signals S6A, S6B change from logic 0 to logic 1, and two pulses occur in the signal S7. The values of the signals S6A, S6B are each reset by feedback of a corresponding one of the signals S6A, S6B, so that the pulses of the signals S6A, S6B are short in pulse width. The two pulses of the signal S7 indicated by the arrow P1 are not connected into one, but are close to each other. Therefore, the pulses are shorter in pulse width than a minimum pulse width necessary for the normal operation of the TDC 63, and there is a possibility that the TDC 63 malfunctions, that is, measures a wrong time.

As indicated by an arrow P2, when one and the other of the pixels 41 subsequently receive a photon at almost the same timing, the values of the signals S1A, S1B change from logic 0 to logic 1, the values of the signals S6A, S6B change from logic 0 to logic 1, and two pulses occur again in the signal S7. The two pulses of the signal S7 indicated by the arrow P2 are connected into one. Therefore, the TDC 63 cannot distinguish between the pulses, but erroneous detection of a wrong time does not occur.

According to the present comparative example, it is possible to prevent neither the proximity between two pulses as indicated by the arrow P1 nor the connection of two pulses as indicated by the arrow P2. Therefore, when the APD sensor according to the present comparative example receives a plurality of photons in a short period of time, there is a possibility that the malfunction as described above frequently occurs. On the other hand, according to the first embodiment, resetting each DFF circuit 61a by the signal S4 makes it is possible to reduce the possibility of the occurrence of the malfunction as described above.

Figure 8:
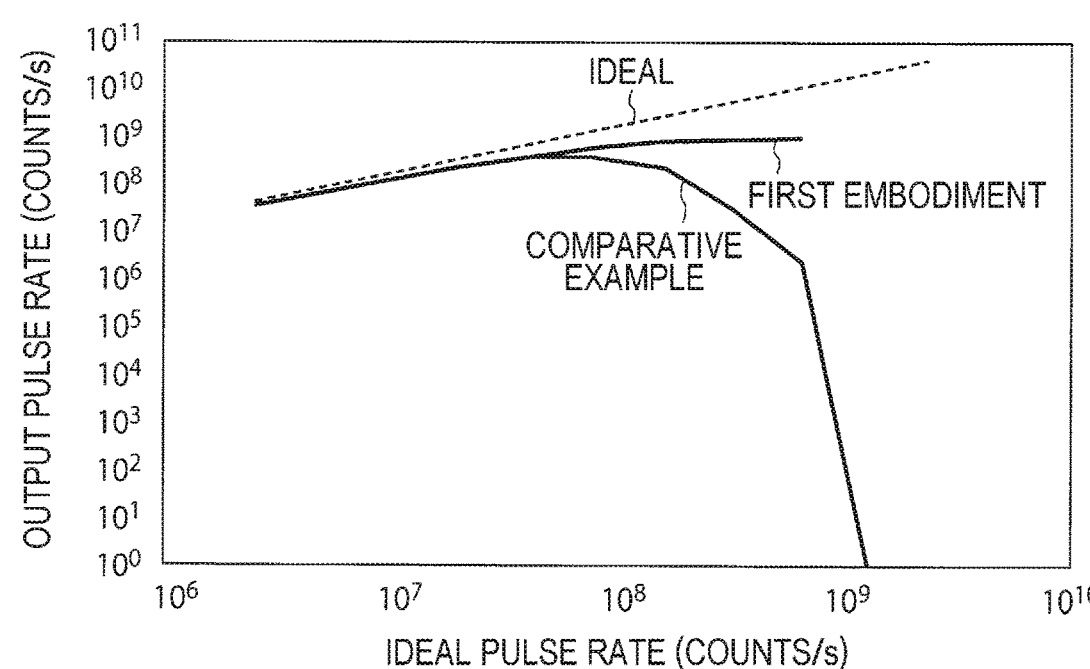
FIG. 8 is a graph for comparing the APD sensor according to the first embodiment with the above-described APD sensor according to the comparative example.

FIG. 8 is a graph for comparing the APD sensor according to the first embodiment with the APD sensor according to the above-described comparative example.

The horizontal axis of FIG. 8 indicates a count rate (ideal count rate) when all photons are correctly counted. The vertical axis of FIG. 8 indicates an actual count rate (output count rate) at which some photons may not be correctly counted. FIG. 8 illustrates a relation between the ideal count rate and the output count rate for an ideal APD sensor having the count rates always equal to each other, the APD sensor according to the first embodiment, and the APD sensor according to the comparative example.

According to FIG. 8, in a case where pulse intervals at which the TDC 63 can continuously detect pulses increases as a value of the ideal count rate increases, an amount of decrease in the output count value increases as in the comparative example. On the other hand, according to the first embodiment, it is possible to reduce a deviation from the value of the ideal count rate even if the value of the ideal count rate increases while preventing the occurrence of an erroneous detection that may occur in the comparative example. Therefore, according to the present embodiment, even if the value of the ideal count rate increases, many photons can be correctly counted.

As described above, the APD sensor according to the present embodiment disables the input of the signals S1A, S1B to the state detection circuits 61 by feeding back the signal S4 from the logical operation circuit 62 to the state detection circuits 61. The present embodiment therefore allows one TDC 63 to count a value relating to the signals S1A, S1B from the plurality of pixels 41 with high accuracy.

Note that the state detection circuits 61 according to the present embodiment correspond to the pixels 41 on a one-to-one basis, so that it is desirable that the state detection circuits 61 be disposed so as to face the pixel array region 42 as described with reference to FIG. 3. On the other hand, the TDC 63 according to the present embodiment do not correspond to the pixels 41 on a one-to-one basis, so that it is desirable that the TDC 63 be disposed so as not to face the pixel array region 42. The logical operation circuit 62 may be disposed so as to face or not to face the pixel array region 42. For example, the logical operation circuit 62 may be disposed across the position facing the pixel array region 42 and the position not facing the pixel array region 42. In this case, the transistors 62a of the logical operation circuit 62 correspond to the pixels 41 on a one-to-one basis, so that the transistors 62a may be disposed so as to face the pixel array region 42. Note that the TDC 63 may be disposed in the pixel array region 42 rather than in the signal processing unit 54.

Hereinafter, APD sensors according to second to seventh embodiments will be described. The APD sensors are each included in the imaging unit 22 illustrated in FIG. 1, as with the APD sensor according to the first embodiment. The APD sensors according to the second to seventh embodiments will be described mainly on the basis of differences from the APD sensor according to the first embodiment, and no description will be given, as appropriate, of common points with the APD sensor according to the first embodiment.

Second Embodiment

Figure 9:
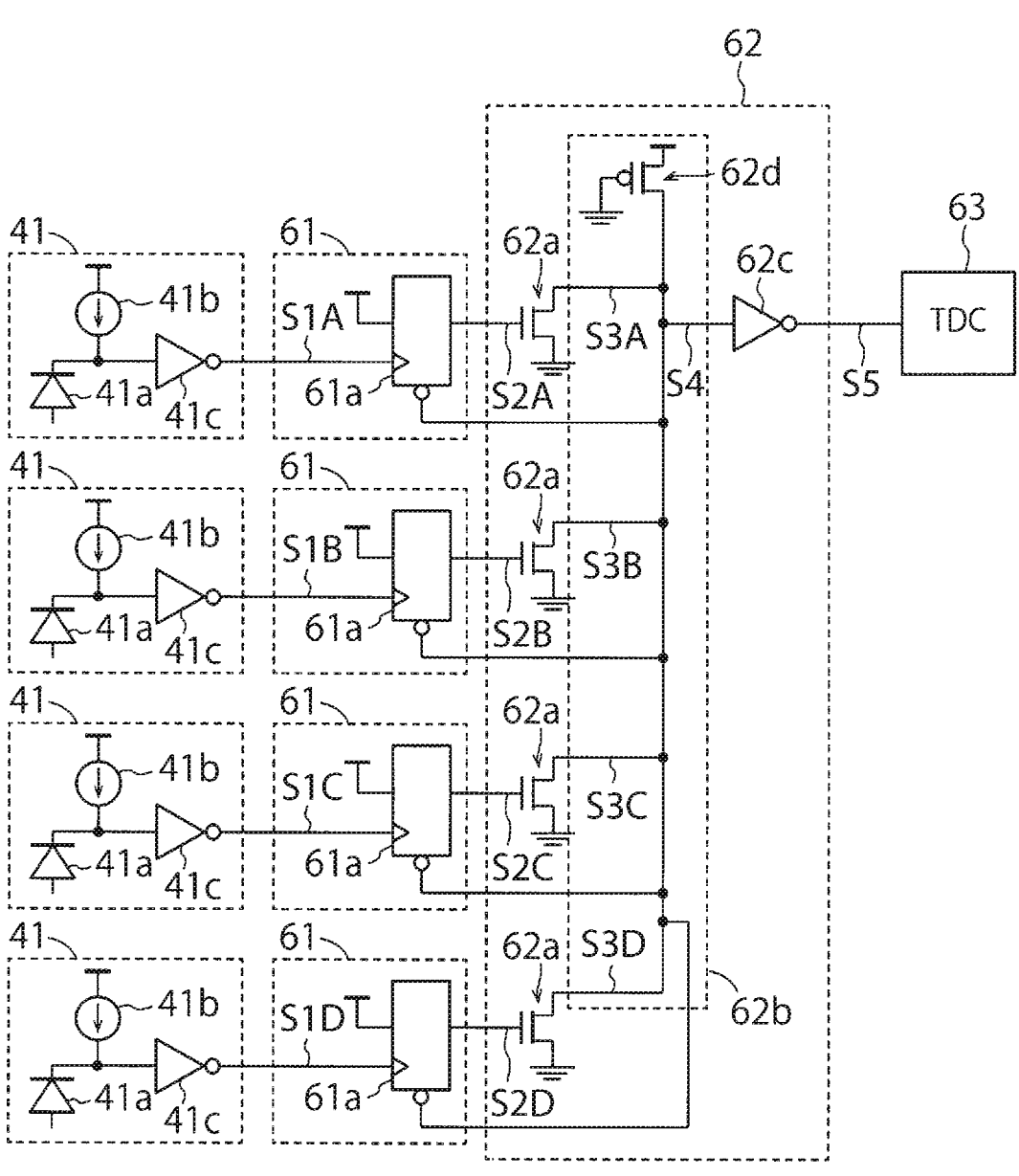
FIG. 9 is a circuit diagram illustrating a configuration of an APD sensor according to a second embodiment.

FIG. 9 is a circuit diagram illustrating a configuration of the APD sensor according to the second embodiment.

The APD sensor according to the present embodiment includes four pixels 41, four state detection circuits 61, a logical operation circuit 62, and a TDC 63. The pixels 41, the state detection circuits 61, and the TDC 63 according to the present embodiment are identical in configuration to the pixels 41, the state detection circuits 61, and the TDC 63 according to the first embodiment, respectively. FIG. 9 illustrates signals S1C, S1D output from the pixels 41 in a similar manner to the signals S1A, S1B, and signals S2C, S2D output from the state detection circuits 61 in a similar manner to the signals S2A, S2B.

The logical operation circuit 62 according to the present embodiment includes four transistors 62a, a wired NOR circuit 62b, and a NOT gate 62c, and the wired NOR circuit 62b includes a transistor 62d. The transistors 62a, the NOT gate 62c, and the transistor 62d according to the present embodiment are identical in configuration to the transistors 62a, the NOT gate 62c, and the transistor 62d according to the first embodiment, respectively. FIG. 9 illustrates signals S3C, S3D output from the transistors 62a in a similar manner to the signals S3A, S3B, and a signal S5 output from the NOT gate 62c.

The wired NOR circuit 62b according to the present embodiment includes wiring that electrically connects the four transistors 62a and the NOT gate 62c, and the transistor 62d disposed between the wiring and power supply wiring. The wired NOR circuit 62b performs a logical operation on the signal S3A, the signal S3B, the signal S3C, and the signal S3D to generate a signal S4 including a result of the logical operation. The wired NOR circuit 62b performs a NOR operation on the signals S3A to S3D, so that the signal S4 includes a result of the NOR operation. The signal S4 is output from the wired NOR circuit 62b to the NOT gate 62c and an R terminal of each DFF circuit 61a.

According to the present embodiment, the use of the wired NOR circuit 62b allows the signals S3A to S3D to converge into the signal S4. In general, the wired NOR circuit 62b can be implemented with a simple circuit configuration as compared with the NOR gate. Therefore, according to the present embodiment, the use of the wired NOR circuit 62b allows the signals S3A to S3D to converge into the signal S4 with a simple circuit configuration. Note that although the wired NOR circuit 62b according to the present embodiment causes the four signals S3A to S3D to converge into the signal S4, three signals or five or more signals may converge into the signal S4. Furthermore, the logical operation circuit 62 according to the present embodiment may include a wired AND circuit, a wired OR circuit, or a wired NAND circuit rather than the wired NOR circuit 62b.

Third Embodiment

Figure 10:
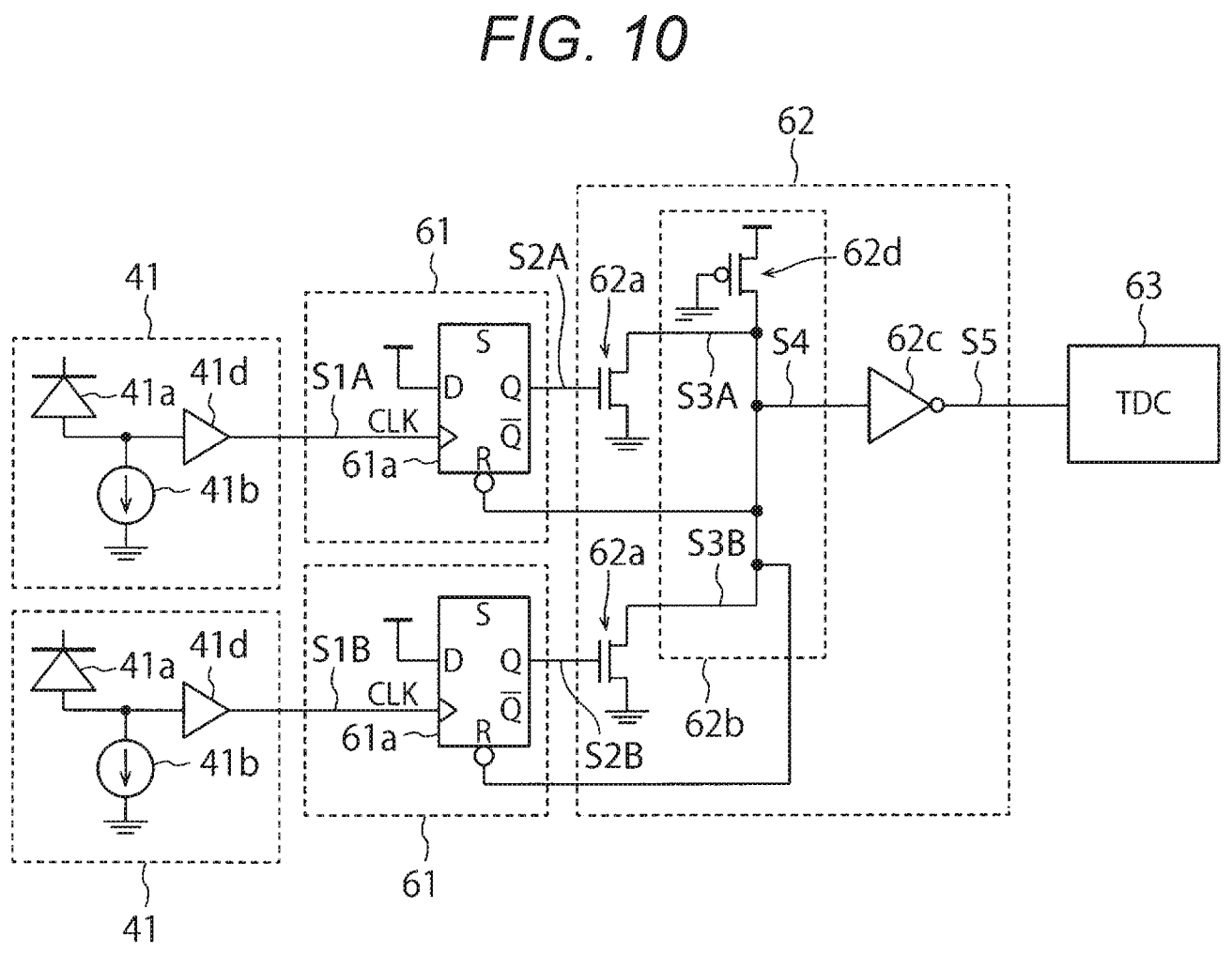

FIG. 10 is a circuit diagram illustrating a configuration of the APD sensor according to the third embodiment.

Each APD 41a according to the present embodiment includes a buffer 41d rather than the inverter 41c. Furthermore, each pixel 41 according to the present embodiment has an anode of the APD 41a rather than a cathode of the APD 41a electrically connected to a current source 41b and the buffer 41d, and is electrically connected to a corresponding state detection circuit 61 via the buffer 41d. The buffer 41d amplifies a signal from the APD 41a and outputs a signal S1A (or S1B) to a corresponding state detection circuit 61.

The APD 41a may be disposed as in either the first embodiment or the present embodiment with various circumstances taken into consideration. For example, in a case where the imaging unit 22 can be easily manufactured if the APD 41a is disposed as in the present embodiment, the APD 41a may be disposed as in the present embodiment. On the other hand, in a case where the performance of the imaging unit 22 is improved if the APD 41a is disposed as in the first embodiment, the APD 41a may be disposed as in the first embodiment.

Fourth Embodiment

Figure 11:
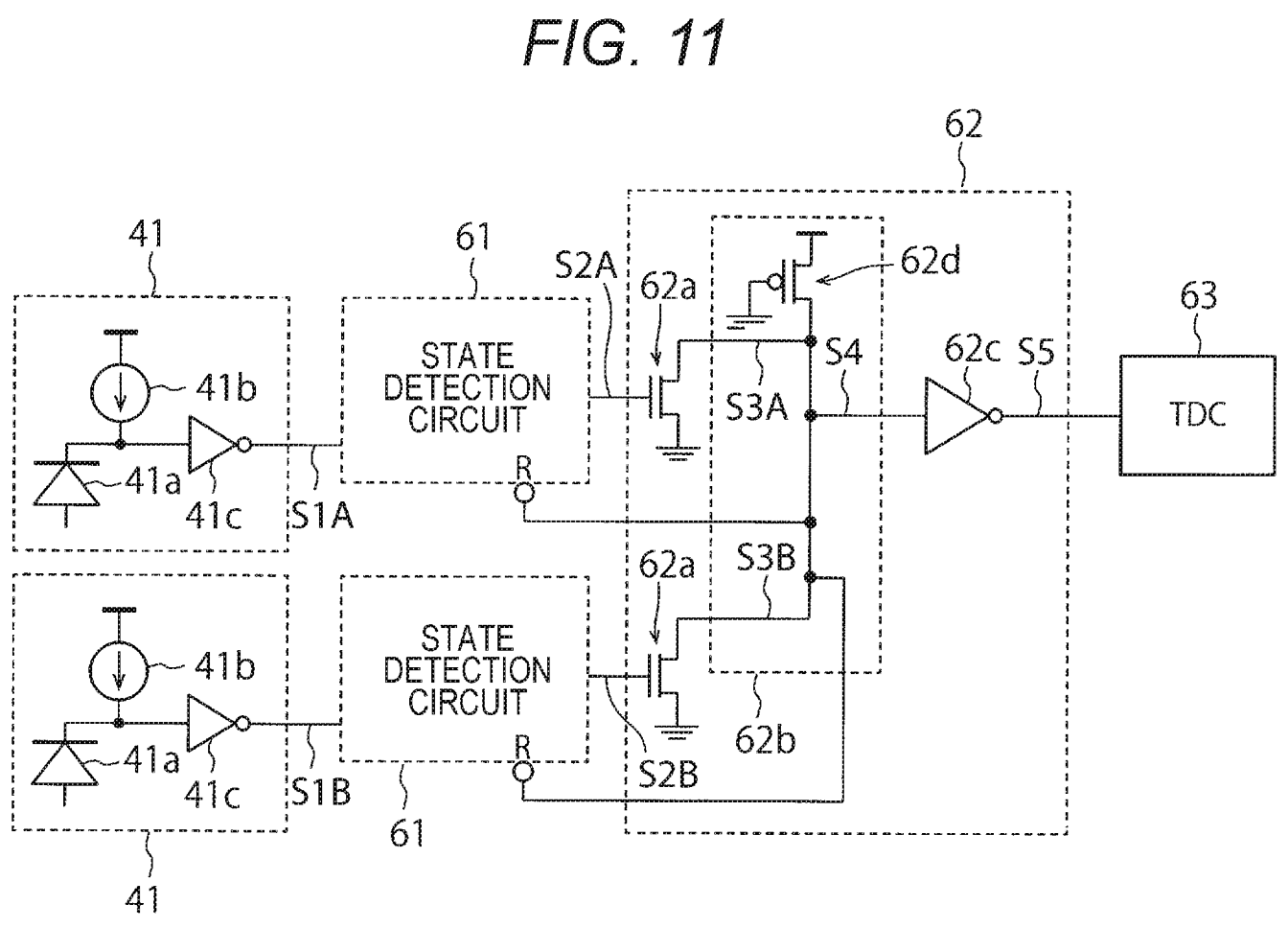

FIG. 11 is a circuit diagram illustrating a configuration of the APD sensor according to the fourth embodiment.

Each state detection circuit 61 according to the first embodiment includes the DFF circuit 61a that detects the edge of the signal S1A (or S1B), whereas each state detection circuit 61 according to the present embodiment includes a latch circuit that detects a level of the signal S1A (or S1B). An example of such a latch circuit will be described with reference to FIGS. 12 and 13.

Figure 12:
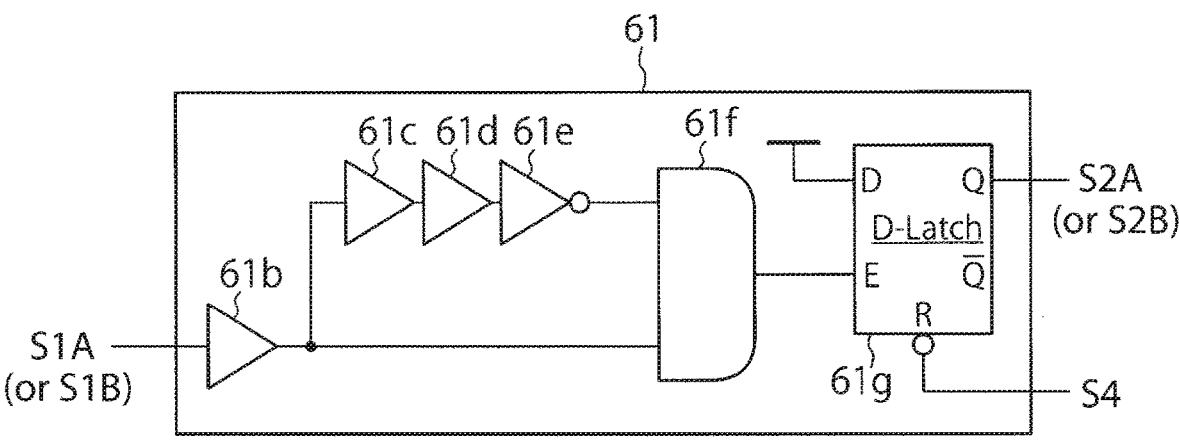
FIG. 12 is a circuit diagram illustrating a configuration example of a state detection circuit according to the fourth embodiment.

FIG. 12 is a circuit diagram illustrating a configuration example of the state detection circuit 61 according to the fourth embodiment.

The state detection circuit 61 illustrated in FIG. 12 includes buffers 61b, 61c, 61d, a NOT gate 61e, an AND gate 61f, and a D latch circuit 61g. The signal S1A (or S1B, the same applies hereinafter) is input to one input terminal of the AND gate 61*f* via the buffer 61*b*, and is input to the other input terminal of the AND gate 61*f* via the buffers 61*b*, 61*c*, 61*d* and the NOT gate 61*e*. The signal input to the latter input terminal is a signal obtained by delaying and inverting the signal input to the former input terminal. The AND gate 61*f* performs an AND operation on these signals, and outputs a signal including a result of the AND operation from an output terminal of the AND gate 61*f*. The AND gate 61*f* outputs, from the output terminal, a signal including a pulse shorter in pulse width than a pulse in the signal S1A.

The D latch circuit 61*g* includes an E (enable) terminal to which the signal from the AND gate 61*f* is input, a Q terminal from which a signal S2A (or S2B, the same applies hereinafter) that is an output signal of the state detection circuit 61, a QB terminal that is an inverting terminal of the Q terminal, and an R terminal to which the signal S4 is input. The D latch circuit 61*g* detects the level of the signal input to the E terminal and outputs the signal S2A indicating a detection result of this level. For example, when the value (level) of the signal from the AND gate 61*f* is logic 1, the value of the signal S2A becomes logic 1.

As described above, the signal input from the AND gate 61*f* to the D latch circuit 61*g* includes a pulse that is short in pulse width. Therefore, the result of the level detection made by the D latch circuit 61*g* according to the present embodiment is similar in content to the result of the edge detection made by the DFF circuit 61*a* according to the first embodiment. According to the present embodiment, it is therefore possible for the D latch circuit 61*g* to output the signal 2A similar in characteristic to the signal S2A output from the DFF circuit 61*a* according to the first embodiment.

Figure 13:
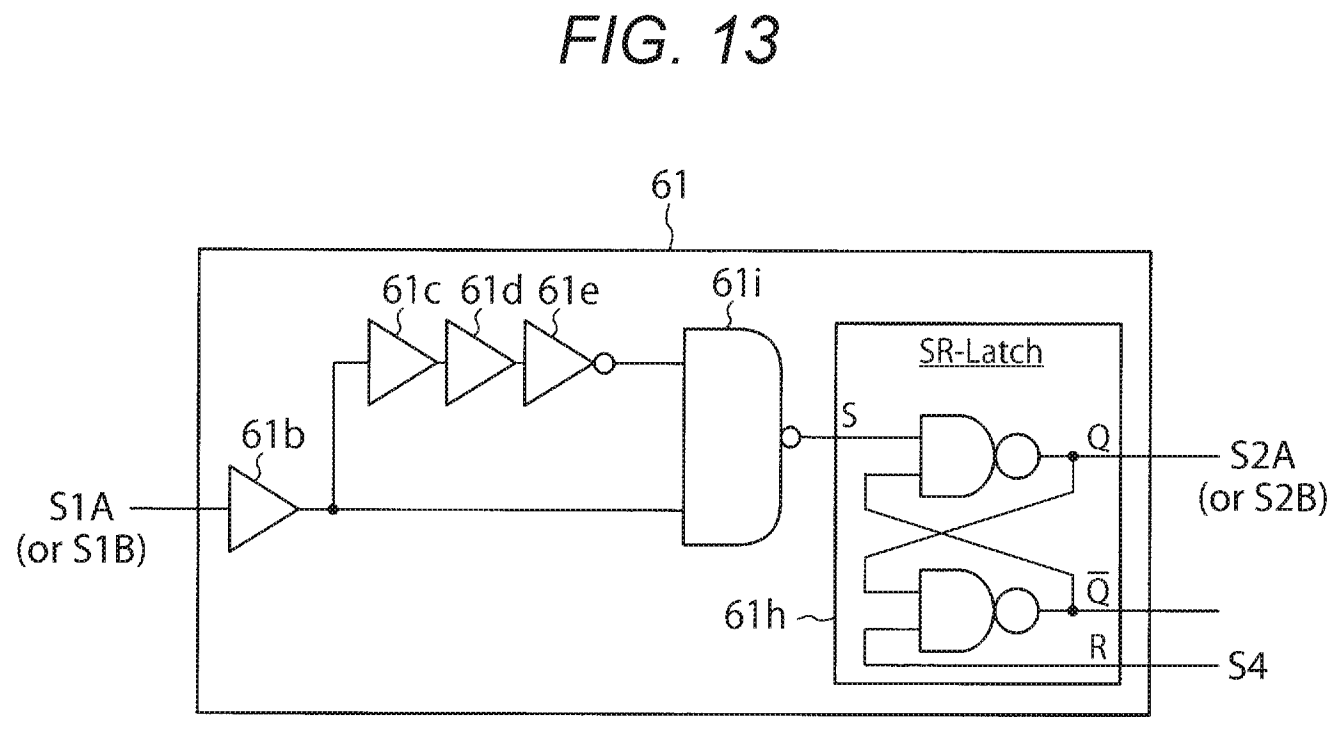

FIG. 13 is a circuit diagram illustrating another configuration example of the state detection circuit 61 according to the fourth embodiment.

The state detection circuit 61 illustrated in FIG. 13 includes buffers 61*b*, 61*c*, 61*d*, a NOT gate 61*e*, a NAND gate 61*i*, and an SR latch circuit 61*h*. Therefore, the state detection circuit 61 illustrated in FIG. 13 has a configuration in which an AND gate 62*f* and the D latch circuit 61*g* of the state detection circuit 61 illustrated in FIG. 12 are replaced with a NAND gate 62*i* and the SR latch circuit 61*h*. The signal SA is input to one input terminal of the NAND gate 61*i* via the buffer 61*b*, and is input to the other input terminal of the NAND gate 61*i* via the buffers 61*b*, 61*c*, 61*d* and the NOT gate 61*e*. The signal input to the latter input terminal is a signal obtained by delaying and inverting the signal input to the former input terminal. The NAND gate 61*i* performs a NAND operation on the signals, and outputs a signal including a result of the NAND operation from an output terminal of the NAND gate 61*i*. The NAND gate 61*i* outputs, from the output terminal, a signal including a pulse shorter in pulse width than a pulse in the signal S1A.

The SR latch circuit 61*h* has an S terminal to which the signal from the NAND gate 61*i* is input, a Q terminal from which the signal S2A that is an output signal of the state detection circuit 61 is output, a QB terminal that is an inverting terminal of the Q terminal, and an R terminal to which the signal S4 is input. The SR latch circuit 61*h* detects the level of the signal input to the S terminal and outputs the signal S2A indicating a detection result of this level. For example, in a case where the value (level) of the signal from the NAND gate 61*i* is logic 0, the value of the signal S2A becomes logic 1.

As described above, the signal input from the NAND gate 61*i* to the SR latch circuit 61*h* includes a pulse that is short in pulse width. Therefore, the result of the level detection made by the SR latch circuit 61*h* according to the present embodiment is similar in content to the result of the edge detection made by the DFF circuit 61*a* according to the first embodiment. According to the present embodiment, it is therefore possible for the SR latch circuit 61*h* to output the signal 2A similar in characteristic to the signal S2A output from the DFF circuit 61*a* according to the first embodiment.

As described above, according to the present embodiment, it is possible to implement the state detection circuit 61 similar in functionality to the state detection circuit 61 according to the first embodiment using a latch circuit rather than a flip-flop circuit.

Note that the signal S4 according to the present embodiment may be input to an S terminal of the D latch circuit 61*g* rather than the R terminal of the D latch circuit 61*g*. Furthermore, the SR latch circuit 61*h* according to the present embodiment may receive the signal from the NAND gate 61*i* at the R terminal and receive the signal S4 at the S terminal. Even in such cases, it is possible to implement functionality similar to the functionality of the state detection circuit 61 illustrated in FIG. 13 or 14.

Fifth Embodiment

Figure 14:
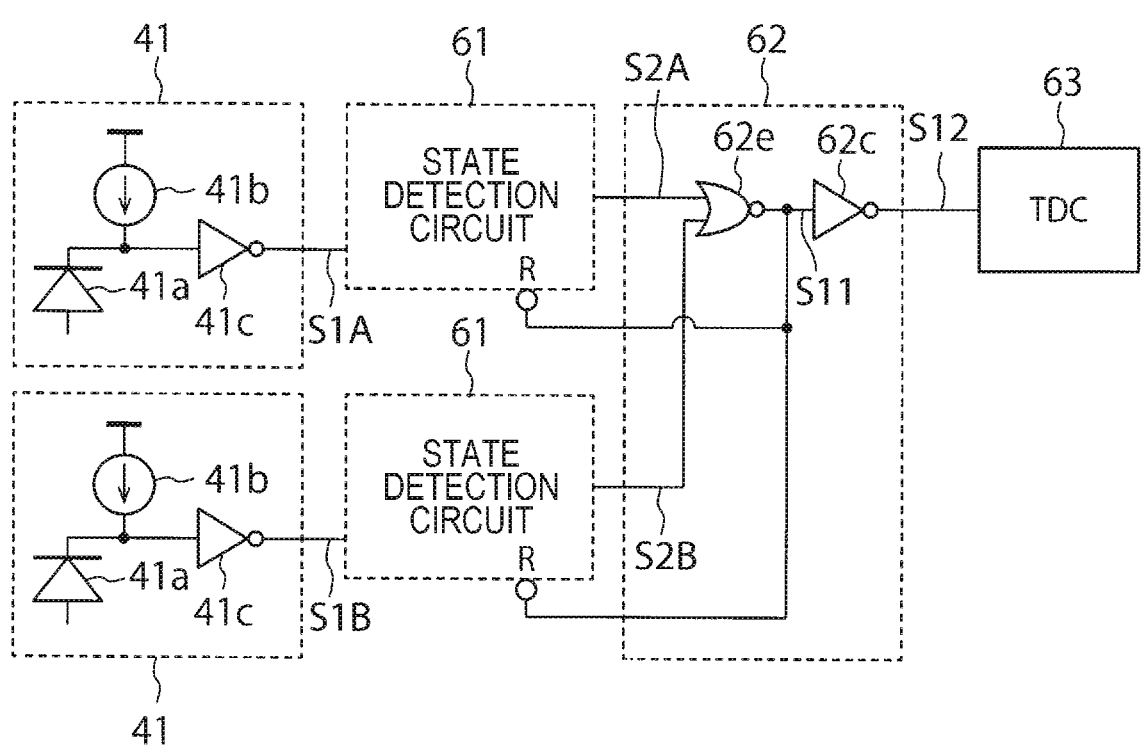
FIG. 14 is a circuit diagram illustrating a configuration of an APD sensor according to a fifth embodiment.

FIG. 14 is a circuit diagram illustrating a configuration of the APD sensor according to the fifth embodiment.

The APD sensor according to the present embodiment includes a plurality of pixels 41, a plurality of state detection circuits 61, a logical operation circuit 62, and a TDC 63. The pixels 41 and the TDC 63 according to the present embodiment are identical in configuration to the pixels 41 and the TDC 63 according to the first embodiment, respectively. Furthermore, the state detection circuits 61 according to the present embodiment are identical in configuration to the state detection circuits 61 according to the first or fourth embodiment.

The logical operation circuit 62 according to the present embodiment includes a NOR gate 62*e* and a NOT gate 62*c*. The NOR gate 62*e* has one input terminal to which a signal S2A is input, the other input terminal to which a signal S2B is input, and an output terminal from which a signal S11 including a result of a NOR operation on the signals S2A, S2B is output. The signal S11 is input to the NOT gate 62*c* and an R terminal of each state detection circuit 61. The NOT gate 62*c* outputs a signal S12 including a result of a NOT operation on the signal S11. The signal S12 is output from the logical operation circuit 62 to the TDC 63. The signal S11 and the signal S12 are examples of the fourth signal according to the present disclosure.

According to the present embodiment, it is possible to implement the logical operation circuit 62 similar in functionality to the logical operation circuit 62 according to the first embodiment using the NOR gate 62*e* rather than the wired NOR circuit 62*a*. The use of the NOR gate 62*e* has an advantage that, for example, the input disabled period (times W1, W2) can be shortened as compared with a case where the wired NOR circuit 62*a* is used. This effect generally increases as the number of state detection circuits 61 of the APD sensor increases.

Note that the logical operation circuit 62 according to the present embodiment may include an AND gate, an OR gate, or a NAND gate rather than the NOR gate 62*e*.

Sixth Embodiment

Figure 15:
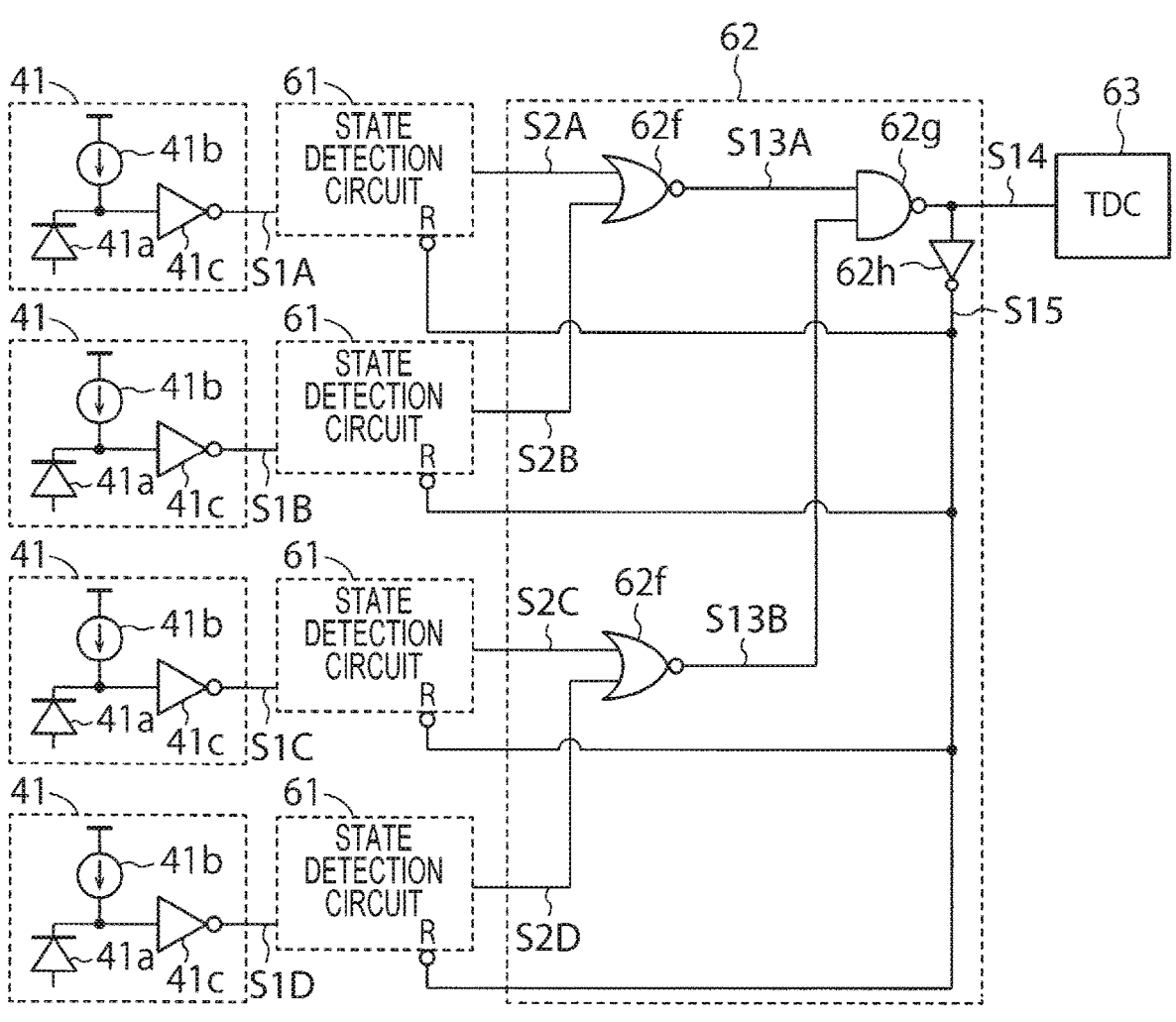
FIG. 15 is a circuit diagram illustrating a configuration of an APD sensor according to a sixth embodiment.

FIG. 15 is a circuit diagram illustrating a configuration of the APD sensor according to the sixth embodiment.

The APD sensor according to the present embodiment includes four pixels 41, four state detection circuits 61, a logical operation circuit 62, and a TDC 63. The pixels 41 and the TDC 63 according to the present embodiment are identical in configuration to the pixels 41 and the TDC 63 according to the first or second embodiment, respectively. Furthermore, the state detection circuits 61 according to the present embodiment are identical in configuration to the state detection circuits 61 according to the first, second or fourth embodiment.

The logical operation circuit 62 according to the present embodiment includes two NOR gates 62f, a NAND gate 62g, and one NOT gate 62h. The one of the NOR gates 62f has one input terminal to which a signal S2A is input, the other input terminal to which a signal S2B is input, and an output terminal from which a signal S13A including a result of a NOR operation on the signal S2A and the signal S2B is output. The other of the NOR gates 62f has one input terminal to which a signal S2C is input, the other input terminal to which a signal S2D is input, and an output terminal from which a signal S13B including a result of a NOR operation on the signal S2C and the signal S2D is output. The NAND gate 62g has one input terminal to which the signal S13A is input, the other input terminal to which the signal S13B is input, and an output terminal from which a signal S14 including a result of a NAND operation on the signal S13A and the signal S13B is output. The NOT gate 62h has an input terminal to which the signal S14 is input and an output terminal from which a signal S15 including a result of a NOT operation on the signal S14 is output. The signal S14 is output from the logical operation circuit 62 to the TDC 63, and the signal S15 is input to an R terminal of each state detection circuit 61. The signals S13A, S13B, S14, S15 are examples of the fourth signal according to the present disclosure.

According to the present embodiment, it is possible to implement the logical operation circuit 62 similar in functionality to the logical operation circuit 62 according to the first embodiment using a combination of logic gates. It is therefore possible to produce an effect similar to the effect produced by the logical operation circuit 62 according to the fifth embodiment, for example.

Note that at least one of the one NOR gate 62f or the other NOR gate 62f according to the present embodiment may be replaced with a wired NOR circuit. Furthermore, the NAND gate 62g according to the present embodiment may be replaced with a wired NAND circuit. As described above, the logical operation circuit 62 according to the present embodiment may include at least one of a wired AND circuit, a wired OR circuit, a wired NAND circuit, or a wired NOR circuit, and at least one of an AND gate, an OR gate, a NAND gate, or a NOR gate.

Seventh Embodiment

Figure 16:
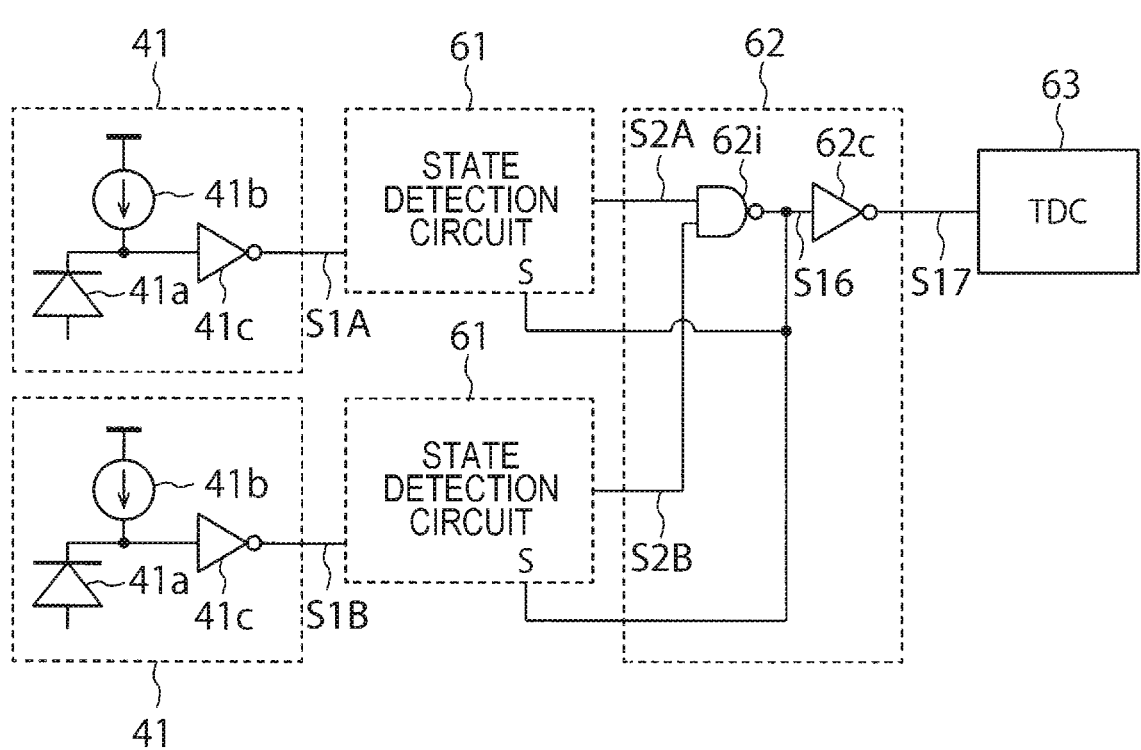
FIG. 16 is a circuit diagram illustrating a configuration of an APD sensor according to a seventh embodiment.

FIG. 16 is a circuit diagram illustrating a configuration of the APD sensor according to the seventh embodiment.

The APD sensor according to the present embodiment includes a plurality of pixels 41, a plurality of state detection circuits 61, a logical operation circuit 62, and a TDC 63. The pixels 41 and the TDC 63 according to the present embodiment are identical in configuration to the pixels 41 and the TDC 63 according to the first embodiment, respectively. Furthermore, the state detection circuits 61 according to the present embodiment are identical in configuration to the state detection circuits 61 according to the first or fourth embodiment.

The logical operation circuit 62 according to the present embodiment includes a NAND gate 62i and a NOT gate 62c. The NAND gate 62i has one input terminal to which a signal S2A is input, the other input terminal to which a signal S2B is input, and an output terminal from which a signal S16 including a result of a NAND operation on the signal S2A and the signal S2B is output. The signal S16 is input to the NOT gate 62c and an R terminal of each state detection circuit 61. The NOT gate 62c outputs a signal S17 including a result of a NOT operation on the signal S16. The signal S17 is output from the logical operation circuit 62 to the TDC 63. The signal S16 and the signal S17 are examples of the fourth signal according to the present disclosure.

According to the present embodiment, it is possible to implement the logical operation circuit 62 similar in functionality to the logical operation circuit 62 according to the first embodiment using a logic gate other than a NOR gate. It is therefore possible to produce an effect similar to the effect produced by the logical operation circuit 62 according to the fifth embodiment, for example.

Note that the imaging unit 22 according to the first to seventh embodiments is provided in the ranging system, but may be provided in a system or a device other than the ranging system. The imaging unit 22 according to the first to seventh embodiments may be used in a mode such as an application example to be described later, for example.

Application Example

Figure 17:
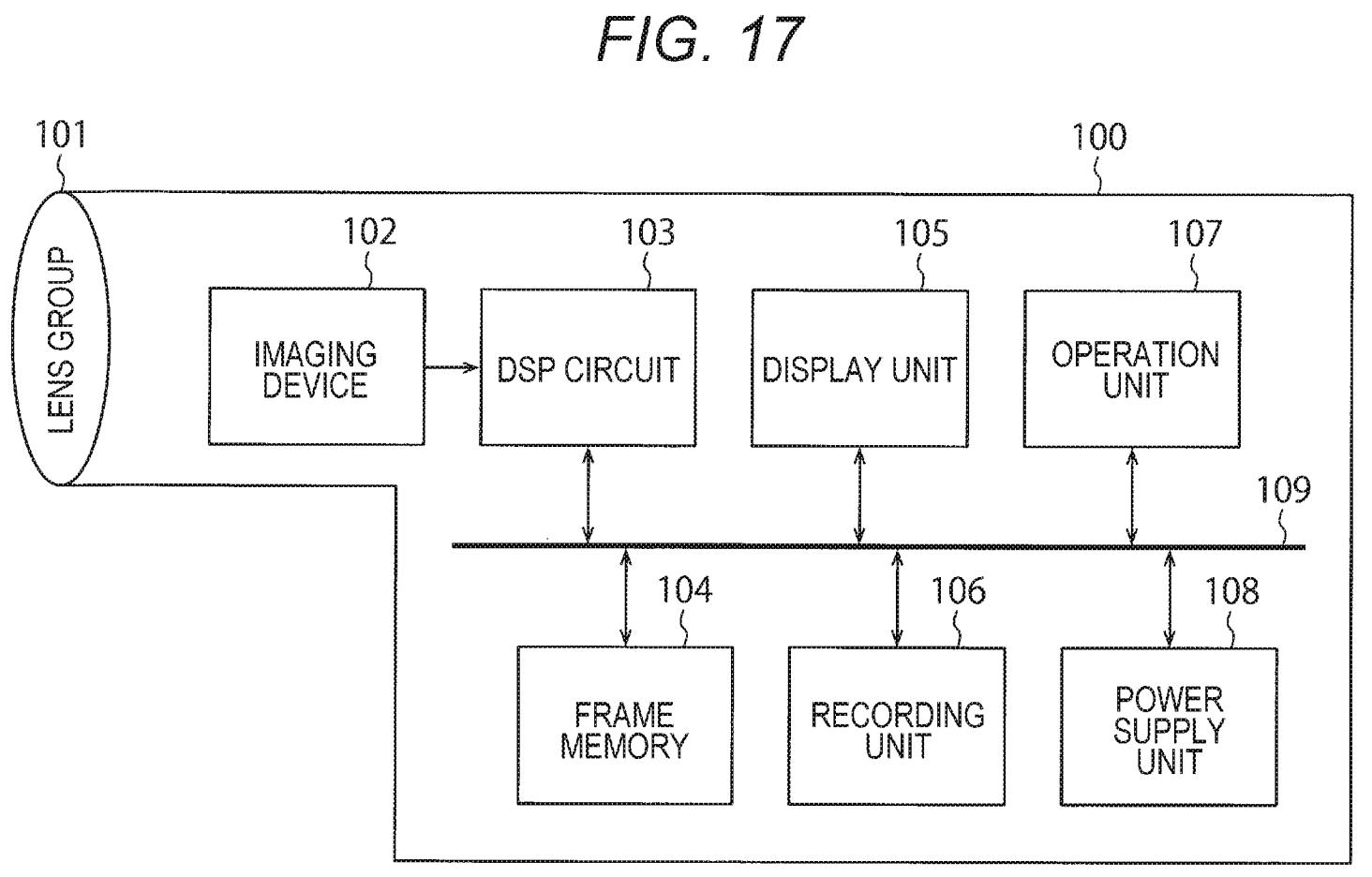

FIG. 17 is a block diagram illustrating a configuration example of an electronic device. An electrical device illustrated in FIG. 17 is a camera 100.

The camera 100 includes an optical unit 101 including a lens group and the like, an imaging device 102 that is the imaging unit 22 according to any one of the first to seventh embodiments, a digital signal processor (DSP) circuit 103 that is a camera signal processing circuit, a frame memory 104, a display unit 105, a recording unit 106, an operation unit 107, and a power supply unit 108. Furthermore, the DSP circuit 103, the frame memory 104, the display unit 105, the recording unit 106, the operation unit 107, and the power supply unit 108 are connected to each other over a bus line 109.

The optical unit 101 receives incident light (image light) from a subject to form the incident light as an image on an imaging surface of the imaging device 102. The imaging device 102 converts the amount of the incident light formed as an image on the imaging surface by the optical unit 101 into an electrical signal for each pixel, and outputs the electrical signal as a pixel signal.

The DSP circuit 103 performs signal processing on the pixel signal output from the imaging device 102. The frame memory 104 is a memory for storing one frame of a moving image or a still image captured by the imaging device 102.

The display unit 105 includes, for example, a display device of a panel type such as a liquid crystal panel or an organic EL panel, and displays the moving image or the still image captured by the imaging device 102. The recording unit 106 records the moving image or the still image captured by the imaging device 102 on a recording medium such as a hard disk or a semiconductor memory.

The operation unit 107 issues operation commands for various functions of the camera 100 under operation by a user. The power supply unit 108 supplies, to the DSP circuit 103, the frame memory 104, the display unit 105, the recording unit 106, and the operation unit 107, various types of power serving as operation power of these power supply targets as needed.

The acquisition of an image of a good quality can be expected by the use of the imaging unit 22 according to any one of the first to seventh embodiments as the imaging device 102.

Such a solid-state imaging device is applicable to various other products. For example, the solid-state imaging device may be installed on any type of mobile object such as an automobile, an electric vehicle, a hybrid electric vehicle, a motorcycle, a bicycle, a personal transporter, a plane, a drone, a ship, or a robot.

FIG. 18 is a block diagram illustrating a configuration example of a mobile object control system. The mobile object control system illustrated in FIG. 18 is a vehicle control system 200.

The vehicle control system 200 includes a plurality of electronic control units connected over a communication network 201. In the example illustrated in FIG. 18, the vehicle control system 200 includes a drive system control unit 210, a body system control unit 220, a vehicle-exterior information detection unit 230, a vehicle-interior information detection unit 240, and an integrated control unit 250. FIG. 18 further illustrates a microcomputer 251, an audio image output unit 252, and an in-vehicle network interface (I/F) 253 as components of the integrated control unit 250.

The drive system control unit 210 controls operation of devices related to a drive system of a vehicle in accordance with various programs. For example, the drive system control unit 210 functions as a control device of a driving force generation device for generating a driving force of the vehicle such as an internal combustion engine or a driving motor, a driving force transmission mechanism for transmitting the driving force to wheels, a steering mechanism for adjusting a steering angle of the vehicle, a braking device for generating a braking force of the vehicle, and the like.

The body system control unit 220 controls operation of various devices installed on a vehicle body in accordance with various programs. For example, the body system control unit 220 functions as a control device of a smart key system, a keyless entry system, a power window device, or various lamps (such as a headlamp, a tail lamp, a brake lamp, a turn signal, and a fog lamp). In this case, radio waves transmitted from a portable device that substitutes for a key or signals of various switches can be input to the body system control unit 220. Upon receipt of such radio waves or signals, the body system control unit 220 controls a door lock device, the power window device, the lamps, or the like of the vehicle.

The vehicle-exterior information detection unit 230 detects information regarding the exterior of the vehicle on which the vehicle control system 200 is installed. For example, an imaging unit 231 is connected to the vehicle-exterior information detection unit 230. The vehicle-exterior information detection unit 230 causes the imaging unit 231 to capture an image of an outside view seen from the vehicle, and receives the captured image from the imaging unit 231. The vehicle-exterior information detection unit 230 may perform object detection processing of detecting an object such as a person, a vehicle, an obstacle, a sign, or a character on a road surface or distance detection processing of detecting a distance to such an object on the basis of the received image.

The imaging unit 231 is an optical sensor that receives light and outputs an electrical signal corresponding to the amount of the received light. The imaging unit 231 can output the electrical signal as an image or can output the electrical signal as distance-measurement information. The light received by the imaging unit 231 may be visible light or invisible light such as infrared rays. The imaging unit 231 includes the imaging unit 22 according to any one of the first to seventh embodiments.

The vehicle-interior information detection unit 240 detects information regarding the interior of the vehicle on which the vehicle control system 200 is installed. For example, a driver condition detection unit 241 that detects a condition of a driver is connected to the vehicle-interior information detection unit 240. The driver condition detection unit 241 may include, for example, a camera that captures an image of the driver, and the vehicle-interior information detection unit 240 may calculate a degree of fatigue or a degree of concentration of the driver or may determine whether or not the driver is dozing on the basis of the detection information input from the driver condition detection unit 241. The camera may include the imaging unit 22 according to any one of the first to seventh embodiments, and may be, for example, the camera 100 illustrated in FIG. 17.

The microcomputer 251 may calculate a control target value of the driving force generation device, the steering mechanism, or the braking device on the basis of the vehicle-exterior information acquired by the vehicle-exterior information detection unit 230 or the vehicle-interior information acquired by the vehicle-interior information detection unit 240, and output a control command to the drive system control unit 210. For example, the microcomputer 251 can perform coordinated control for the purpose of implementing a function of an advanced driver assistance system (ADAS) including vehicle collision avoidance, impact mitigation, follow-up traveling based on an inter-vehicle distance, traveling with the vehicle speed maintained, collision warning, lane departure warning, or the like.

Furthermore, the microcomputer 251 can perform coordinated control for the purpose of automated driving or the like in which the vehicle autonomously travels without depending on driver's operation by controlling the driving force generation device, the steering mechanism, or the braking device on the basis of the information regarding surroundings of the vehicle acquired by the vehicle-exterior information detection unit 230 or the vehicle-interior information detection unit 240.

Furthermore, the microcomputer 251 can output a control command to the body system control unit 220 on the basis of the vehicle-exterior information acquired by the vehicle-exterior information detection unit 230. For example, the microcomputer 251 can perform coordinated control for the purpose of preventing glare, such as switching from a high beam to a low beam, by controlling the headlamp in accordance with the position of a preceding vehicle or an oncoming vehicle detected by the vehicle-exterior information detection unit 230.

The audio image output unit 252 transmits an output signal of at least one of a sound or an image to an output device capable of visually or audibly notifying the occupant of the vehicle or the outside of the vehicle of information. In the example illustrated in FIG. 18, an audio speaker 261, a display unit 262, and an instrument panel 263 are illustrated as such an output device. The display unit 262 may include, for example, an on-board display or a head-up display.

Figure 19:
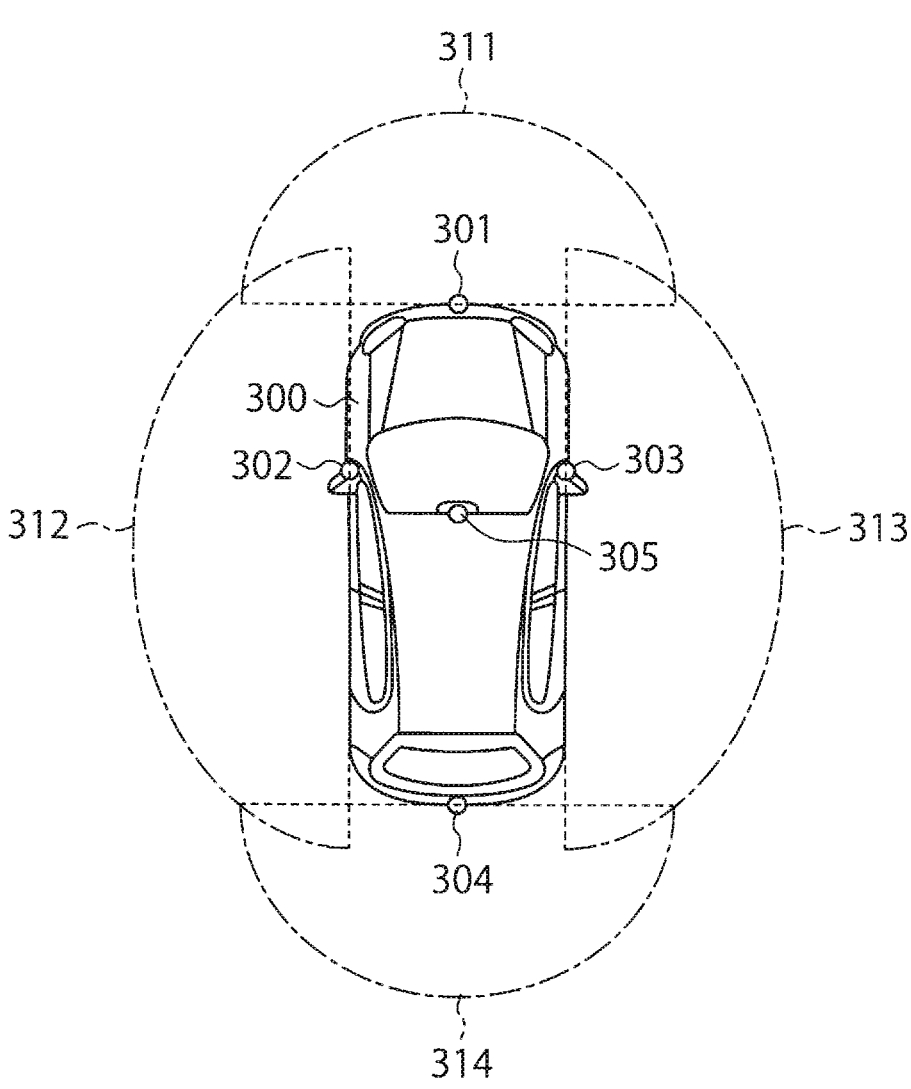
FIG. 19 is a plan view of a specific example of a setting position of an imaging unit illustrated in FIG. 18.

FIG. 19 is a plan view of a specific example of a setting position of the imaging unit 231 illustrated in FIG. 18.

A vehicle 300 illustrated in FIG. 19 includes imaging units 301, 302, 303, 304, 305 as the imaging unit 231. The imaging units 301, 302, 303, 304, 305 are provided, for example, a front nose, a side mirror, a rear bumper, a back door, and an upper portion of a windshield in a vehicle interior of the vehicle 300.

The imaging unit 301 provided at the front nose mainly capture an image of a front view seen from the vehicle 300. The imaging unit 302 provided at the left side mirror and the imaging unit 303 provided at the right side mirror mainly capture images of side views seen from the vehicle 300. The imaging unit 304 provided at the rear bumper or the back door mainly capture an image of a rear view seen from the vehicle 300. The imaging unit 305 provided at the upper portion of the windshield in the vehicle interior mainly capture an image of a front view seen from the vehicle 300. The imaging unit 305 is used to detect, for example, a preceding vehicle, a pedestrian, an obstacle, a traffic light, a traffic sign, a lane, or the like.

FIG. 19 illustrates examples of imaging ranges of the imaging units 301, 302, 303, 304 (hereinafter referred to as "imaging units 301 to 304"). An imaging range 311 indicates an imaging range of the imaging unit 301 provided at the front nose. An imaging range 312 indicates an imaging range of the imaging unit 302 provided at the left side mirror. An imaging range 313 indicates an imaging range of the imaging unit 303 provided at the right side mirror. An imaging range 314 indicates an imaging range of the imaging unit 304 provided at the rear bumper or the back door. For example, it is possible to obtain a bird's-eye view image of the vehicle 300 by superimposing image data captured by the imaging units 301 to 304 on top of one another. Hereinafter, the imaging ranges 311, 312, 313, 314 are referred to as "imaging ranges 311 to 314".

At least one of the imaging units 301 to 304 may have a function of acquiring distance information. For example, at least one of the imaging units 301 to 304 may be a stereo camera including a plurality of imaging devices, or may be an imaging device having pixels for phase difference detection.

For example, the microcomputer 251 (FIG. 18) calculates a distance to each three-dimensional object in the imaging ranges 311 to 314 and changes over time in the distance (speed relative to the vehicle 300) on the basis of the distance information obtained from the imaging unit 301 to 304. The microcomputer 251 can extract, as a preceding vehicle, a closest three-dimensional object on a traveling path of the vehicle 300 on the basis of the calculation results, the three-dimensional object traveling at a predetermined speed (for example, 0 km/h or more) in approximately the same direction as the vehicle 300. Moreover, the microcomputer 251 can set in advance an inter-vehicle distance that needs to be maintained relative to the preceding vehicle, and perform automated deceleration control (including follow-up stop control), automated acceleration control (including follow-up start control), or the like. As described above, according to this example, it is possible to perform coordinated control for the purpose of, for example, automated driving in which a vehicle autonomously travels without depending on driver's operation.

For example, on the basis of the distance information obtained from the imaging units 301 to 304, the microcomputer 251 can extract three-dimensional object data regarding the three-dimensional objects for use in automated avoidance of obstacles by classifying the three-dimensional object data into a two-wheeled vehicle, a standard-sized vehicle, a large-sized vehicle, a pedestrian, a utility pole, and other three-dimensional objects. For example, the microcomputer 251 identifies obstacles around the vehicle 300 as an obstacle that can be visually recognized by the driver of the vehicle 300 and an obstacle that is difficult to be visually recognized. Then, the microcomputer 251 determines a collision risk indicating a risk of collision with each obstacle, and when the collision risk is greater than or equal to a set value and there is a possibility of collision, the microcomputer 251 can give driver assistance for collision avoidance by issuing an alarm to the driver via the audio speaker 261 or the display unit 262 or performing forced deceleration or avoidance steering via the drive system control unit 210.

At least one of the imaging units 301 to 304 may be an infrared camera that detects infrared rays. For example, the microcomputer 251 can recognize a pedestrian by determining whether or not the pedestrian is present in the images captured by the imaging units 301 to 304. Such pedestrian recognition is performed by, for example, a procedure of extracting feature points in the images captured by the imaging units 301 to 304 as infrared cameras, and a procedure of performing pattern matching processing on a series of feature points indicating an outline of an object to determine whether or not the object is a pedestrian. When the microcomputer 251 determines that a pedestrian is present in the images captured by the imaging units 301 to 304 and recognizes the pedestrian, the audio image output unit 252 controls the display unit 262 to display the images with a square contour line for emphasis on the recognized pedestrian superimposed on the images. Furthermore, the audio image output unit 252 may control the display unit 262 to display an icon or the like indicating a pedestrian at a desired position.

Figure 20:
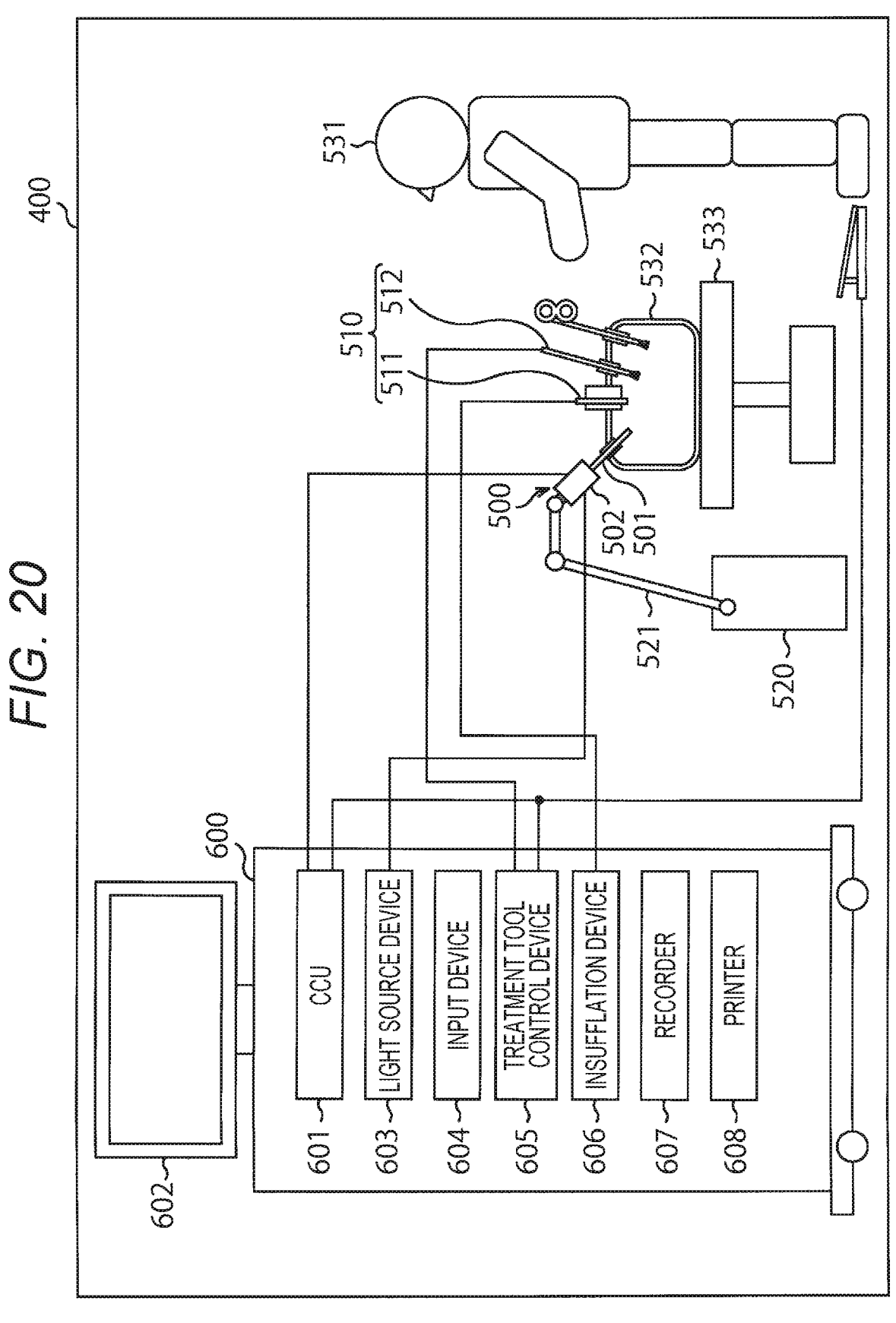
FIG. 20 is a diagram illustrating an example of a schematic configuration of an endoscopic surgery system.

FIG. 20 is a diagram illustrating an example of a schematic configuration of an endoscopic surgery system to which the technology according to the present disclosure (the present technology) is applicable.

FIG. 20 illustrates a state where an operator (surgeon) 531 is performing surgery on a patient 532 on a patient bed 533 using an endoscopic surgery system 400. As illustrated in the drawing, the endoscopic surgery system 400 includes an endoscope 500, other surgical tools 510 such as an insufflation tube 511 and an energy treatment tool 512, a support arm device 520 that supports the endoscope 500, and a cart 600 on which various devices for use in endoscopic surgery are mounted.

The endoscope 500 includes a lens barrel 501, a part of which having a predetermined length from a distal end is inserted into a body cavity of the patient 532, and a camera head 502 connected to a proximal end of the lens barrel 501. In the illustrated example, the endoscope 500 including a so-called rigid scope having the rigid lens barrel 501 is illustrated, but the endoscope 500 may include a so-called flexible scope having a flexible lens barrel.

The lens barrel 501 has an opening into which an objective lens is fitted provided at the distal end of the lens barrel 501. A light source device 603 is connected to the endoscope 500, and light generated by the light source device 603 is guided to the distal end of the lens barrel 501 by a light guide extending through the lens barrel, and is emitted toward an observation target in the body cavity of the patient 532 through the objective lens. Note that the endoscope 500 may be a forward-viewing endoscope, an oblique-viewing endoscope, or a side-viewing endoscope.

An optical system and an imaging element are provided inside the camera head 502, and reflected light (observation light) from the observation target is condensed on the imaging element by the optical system. The observation light is photoelectrically converted by the imaging element, and an electrical signal corresponding to the observation light, that is, an image signal corresponding to an observation image, is generated. The image signal is transmitted to a camera control unit (CCU) 601 as RAW data.

The CCU 601 includes a central processing unit (CPU), a graphics processing unit (GPU), and the like, and collectively controls operation of the endoscope 500 and the display device 602. Moreover, the CCU 601 receives the image signal from the camera head 502, and performs various types of image processing for displaying an image based on the image signal, such as development processing (demosaicing), on the image signal.

The display device 602 displays, under the control of the CCU 601, the image based on the image signal subjected to the image processing by the CCU 601.

The light source device 603 includes a light source such as a light emitting diode (LED), and supplies irradiation light for capturing an image of a surgical site or the like to the endoscope 500.

An input device 604 is an input interface for an endoscopic surgery system 11000. The user can input various types of information and instructions to the endoscopic surgery system 400 via the input device 604. For example, the user inputs an instruction or the like to change an imaging condition (type of the irradiation light, magnification, focal length, or the like) of the endoscope 500.

A treatment tool control device 605 controls driving of the energy treatment tool 512 for tissue ablation, incision, sealing of a blood vessel, or the like. An insufflation device 606 feeds gas into the body cavity of the patient 532 through the insufflation tube 511 in order to inflate the body cavity for the purpose of securing a visual field for the endoscope 500 and securing a work space for the operator. A recorder 607 is a device capable of recording various types of information regarding surgery. A printer 608 is a device capable of printing various types of information regarding surgery in various forms such as text, image, or graph.

Note that the light source device 603 that supplies, to the endoscope 500, the irradiation light for capturing an image of the surgical site may include, for example, an LED, a laser light source, or a white light source including a combination of the LED and the laser light source. In a case where the white light source includes a combination of RGB laser light sources, output intensity and output timing of each color (each wavelength) can be controlled with high accuracy, so that it is possible for the light source device 603 to adjust a white balance of a captured image. Furthermore, in this case, irradiating the observation target with the laser light from each of the RGB laser light sources in a time-division manner and controlling the driving of the imaging element of the camera head 502 in synchronization with the irradiation timing also allows images corresponding to RGB on a one-to-one basis to be captured in a time-division manner. According to this method, a color image can be obtained without a color filter provided in the imaging element.

Furthermore, the driving of the light source device 603 may be controlled so as to change the intensity of light to be output every predetermined time. It is possible to generate a high dynamic range image with neither so-called blocked up shadows nor blown out highlights by controlling the driving of the imaging element of the camera head 502 in synchronization with the timing of the change in the intensity of light to acquire images in a time-division manner and compositing the images.

Furthermore, the light source device 603 may be configured to supply light in a predetermined wavelength band corresponding to special light observation. In the special light observation, for example, so-called narrow band imaging is performed in which an image of predetermined tissue such as a blood vessel in a mucous membrane surface layer is captured with high contrast by emitting light narrower in band than the irradiation light (that is, white light) for normal observation using wavelength dependency of light absorption in body tissue. Alternatively, in the special light observation, fluorescence observation for obtaining an image using fluorescence generated by irradiation with excitation light may be performed. In the fluorescence observation, it is possible to irradiate body tissue with excitation light to observe fluorescence from the body tissue (autofluorescence observation), or to locally inject a reagent such as indocyanine green (ICG) into body tissue and irradiate the body tissue with excitation light corresponding to a fluorescent wavelength of the reagent to obtain a fluorescent image, for example. The light source device 603 may be configured to supply narrow band light and/or excitation light corresponding to such special light observation.

Figure 21:
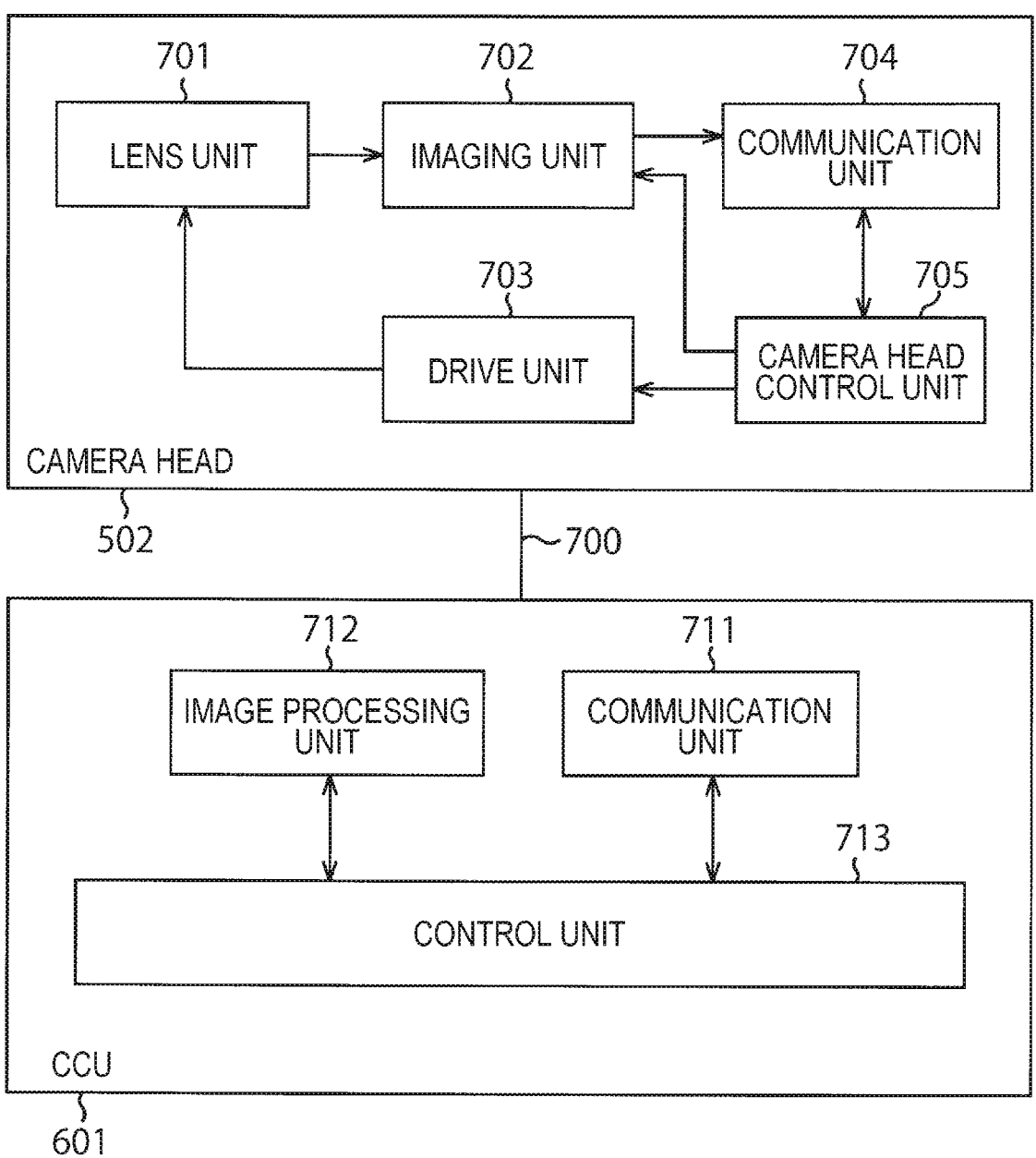
FIG. 21 is a block diagram illustrating examples of functional configurations of a camera head and a CCU.

FIG. 21 is a block diagram illustrating an example of functional configurations of the camera head 502 and the CCU 601 illustrated in FIG. 20.

The camera head 502 includes a lens unit 701, an imaging unit 702, a drive unit 703, a communication unit 704, and a camera head control unit 705. The CCU 601 includes a communication unit 711, an image processing unit 712, and a control unit 713. The camera head 502 and the CCU 601 are communicatively connected to each other over a transmission cable 700.

The lens unit 701 is an optical system provided at a portion for connection with the lens barrel 501. The observation light taken in from the distal end of the lens barrel 501 is guided to the camera head 502 to impinge on the lens unit 701. The lens unit 701 includes a combination of a plurality of lenses including a zoom lens and a focus lens.

The imaging unit 702 includes an imaging element. The imaging unit 702 may include one imaging element (so-called single-plate type) or a plurality of imaging elements (so-called multi-plate type). In a case where the imaging unit 702 is of a multi-plate type, for example, image signals corresponding to RGB on a one-to-one basis are generated by each imaging element, and a color image may be obtained from a combination of the image signals. Alternatively, the imaging unit 702 may include a pair of imaging elements for obtaining right-eye and left-eye image signals corresponding to three-dimensional (3D) display. Such 3D display allows the operator 531 to grasp the depth of living tissue at the surgical site with higher accuracy. Note that, in a case where the imaging unit 702 is of a multi-plate type, a plurality of lens units 701 may be provided corresponding to the respective imaging elements. The imaging unit 702 is, for example, the imaging unit 22 according to any one of the first to seventh embodiments.

Furthermore, the imaging unit 702 need not necessarily be provided in the camera head 502. For example, the imaging unit 702 may be provided just after the objective lens inside the lens barrel 501.

The drive unit 703 includes an actuator, and moves the zoom lens and the focus lens of the lens unit 701 by a predetermined distance along an optical axis under the control of the camera head control unit 705. This makes it possible to adjust, as needed, the magnification and focus of the image captured by the imaging unit 702.

The communication unit 704 includes a communication device for transmitting and receiving various types of information to and from the CCU 601. The communication unit 704 transmits the image signal obtained from the imaging unit 702 as RAW data to the CCU 601 over the transmission cable 700.

Furthermore, the communication unit 704 receives a control signal for controlling driving of the camera head 502 from the CCU 601, and supplies the control signal to the camera head control unit 705. The control signal includes, for example, information regarding the imaging condition such as information for specifying the frame rate of an image to be captured, information for specifying the exposure value at the time of imaging, and/or information for specifying the magnification and the focus of an image to be captured.

Note that the imaging condition such as the frame rate, the exposure value, the magnification, or the focus may be specified by the user as needed, or may be automatically set by the control unit 713 of the CCU 601 on the basis of the acquired image signal. In the latter case, the endoscope 500 is equipped with a so-called auto exposure (AE) function, an auto focus (AF) function, and an auto white balance (AWB) function.

The camera head control unit 705 controls the driving of the camera head 502 on the basis of the control signal from the CCU 601 received via the communication unit 704.

The communication unit 711 includes a communication device for transmitting and receiving various types of information to and from the camera head 502. The communication unit 711 receives an image signal transmitted from the camera head 502 over the transmission cable 700.

Furthermore, the communication unit 711 transmits a control signal for controlling the driving of the camera head 502 to the camera head 502. The image signal and the control signal can be transmitted by means of electrical signal communications, optical communications, or the like.

The image processing unit 712 performs various types of image processing on the image signal that is RAW data transmitted from the camera head 502.

The control unit 713 performs various types of control for capturing an image of the surgical site or the like by the endoscope 500 and displaying a captured image obtained by capturing an image of the surgical site or the like. For example, the control unit 713 generates a control signal for controlling the driving of the camera head 502.

Furthermore, the control unit 713 causes the display device 602 to display a captured image capturing the surgical site or the like on the basis of the image signal subjected to the image processing by the image processing unit 712. At this time, the control unit 713 may recognize various objects in the captured image using various image recognition techniques. For example, the control unit 713 can recognize a surgical tool such as forceps, a specific body part, bleeding, mist at the time of using the energy treatment tool 512, and the like by detecting an edge shape, color, and the like of an object included in the captured image. When displaying the captured image on the display device 602, the control unit 713 may display, using the recognition result, various types of surgery support information with the surgery support information superimposed on the image of the surgical site. The surgery support information displayed in a superimposed manner and presented to the operator 531 makes it possible to reduce a burden on the operator 531 or allows the operator 531 to reliably proceed with surgery.

The transmission cable 700 connecting the camera head 502 and the CCU 601 is an electrical signal cable adapted to electrical signal communications, an optical fiber adapted to optical communications, or a composite cable including the electrical signal cable and the optical fiber.

Here, in the illustrated example, communication is performed by wire using the transmission cable 700, but communication between the camera head 502 and the CCU 601 may be performed by wireless.

Although the embodiments of the present disclosure have been described above, the embodiments may be implemented with various modifications without departing from the gist of the present disclosure. For example, two or more embodiments may be implemented in combination.

Note that the present disclosure may have the following configurations.

(1)

An avalanche photodiode (APD) sensor including:

a plurality of pixels each including an APD;

a plurality of state detection circuits configured to detect states of a plurality of first signals output from the plurality of pixels and generate a plurality of second signals including detection results of the states of the plurality of first signals;

a logical operation circuit configured to perform a logical operation on the plurality of second signals or a plurality of third signals that varies in a manner that depends on the plurality of second signals and generate a fourth signal including a result of the logical operation; and a counter configured to count a value relating to the plurality of first signals on the basis of the fourth signal, in which each of the state detection circuits has an input terminal to which the fourth signal is input, and input of each of the first signals to a corresponding one of the state detection circuits is disabled on the basis of the fourth signal input to the input terminal.

(2)

The APD sensor according to (1), further including:

a first substrate including a pixel array region having the plurality of pixels; and a second substrate bonded to the first substrate, the second substrate including the state detection circuits, the logical operation circuit, and the counter.

(3)

The APD sensor according to (2), in which the state detection circuits and at least a part of the logical operation circuit are disposed so as to face the pixel array region, and the counter is disposed so as not to face the pixel array region or is disposed in the pixel array region.

(4)

The APD sensor according to (2), in which the state detection circuits are disposed so as to face the pixel array region, and at least a part of the logical operation circuit and the counter are disposed so as not to face the pixel array region.

(5)

The APD sensor according to (1), in which the APD is a single photon avalanche diode (SPAD).

(6)

The APD sensor according to (1), in which the APD has a cathode electrically connected to a corresponding one of the state detection circuits.

(7)

The APD sensor according to (1), in which the APD has an anode electrically connected to a corresponding one of the state detection circuits.

(8)

The APD sensor according to (1), in which the input terminal is a reset terminal configured to reset a corresponding one of the state detection circuits.

(9)

The APD sensor according to (1), in which the state detection circuits each detect an edge of a corresponding one of the first signals.

(10)

The APD sensor according to (1), in which the state detection circuits each include a flip-flop circuit.

(11)

The APD sensor according to (10), in which the first signals are each input to a clock terminal of the flip-flop circuit.

(12)

The APD sensor according to (1), in which the state detection circuits each detect a level of a corresponding one of the first signals.

(13)

The APD sensor according to (1), in which the state detection circuits each include a latch circuit.

(14)

The APD sensor according to (13), in which each of the state detection circuits further includes an AND circuit or a NAND circuit configured to perform an AND operation or a NAND operation on two signals obtained from a corresponding one of the first signals, and inputs a signal indicating a result of the AND operation or the NAND operation to the latch circuit.

(15)

The APD sensor according to (1), in which the logical operation circuit includes a plurality of transistors configured to generate the plurality of third signals on the basis of the plurality of second signals.

(16)

The APD sensor according to (15), in which the second signals are each input to a control terminal of a corresponding one of the transistors, and the third signals are each output from a main terminal of a corresponding one of the transistors (for example, a drain terminal or a source terminal of a MOS transistor).

(17)

The APD sensor according to (1), in which the fourth signal includes a result of an AND operation, an OR operation, a NAND operation, or a NOR operation on the plurality of second signals or the plurality of third signals.

(18)

The APD sensor according to (1), in which the logical operation circuit includes a wired AND circuit, a wired OR circuit, a wired NAND circuit, or a wired NOR circuit.

(19)

The APD sensor according to (1), in which the logical operation circuit includes at least one of an AND gate, an OR gate, a NAND gate, or a NOR gate.

(20)

A ranging system including:

a light emitting device configured to irradiate a subject with light;

a light receiving device configured to receive light reflected off the subject; and a ranging device configured to measure a distance to the subject on the basis of the light received by the light receiving device, in which the light receiving device includes:

a plurality of pixels each including an avalanche photo-diode (APD), the APD being configured to receive the light reflected off the subject;

a plurality of state detection circuits configured to detect states of a plurality of first signals output from the plurality of pixels and generate a plurality of second signals including detection results of the states of the plurality of first signals;

a logical operation circuit configured to perform a logical operation on the plurality of second signals or a plurality of third signals that varies in a manner that depends on the plurality of second signals and generate a fourth signal including a result of the logical operation; and a counter configured to count a value relating to the plurality of first signals on the basis of the fourth signal, each of the state detection circuits has an input terminal to which the fourth signal is input, and input of each of the first signals to a corresponding one of the state detection circuits is disabled on the basis of the fourth signal input to the input terminal.

REFERENCE SIGNS LIST

1 Light emitting device
2 Light receiving device
3 Control device
11 Light source drive unit
12 Light source
13 Collimating lens
14 Diffractive optical element
21 Lens unit
22 Imaging unit
23 Imaging signal processing unit
31 Ranging unit
41 Pixel
41a APD
41b Current source
41c Inverter
41d Buffer
42 Pixel array region
43 Control circuit
44 Vertical selection circuit
45 External pixel array signal processing circuit
46 Horizontal selection circuit
51 Light receiving substrate
52 Logic substrate
53 Logic array unit
54 Signal processing unit
55 Imaging control unit
61 State detection circuit
61' State detection circuit
61a DFF circuit
61b Buffer
61c Buffer
61d Buffer
61e NOT gate
61f AND gate
61g D latch circuit
61h SR latch circuit
61i NAND gate
62 Logical operation circuit
62' Logical operation circuit
62a Transistor
62b Wired NOR circuit
62c NOT gate 62*d* Transistor 62*e* NOR gate 62*f* NOR gate 62*g* NAND gate 62*h* NOT gate 62*i* NAND gate

63 TDC

The invention claimed is:

1. An avalanche photodiode (APD) sensor comprising:

a plurality of pixels each including an APD;

a plurality of state detection circuits configured to detect states of a plurality of first signals output from the plurality of pixels and generate a plurality of second signals including detection results of the states of the plurality of first signals;

a logical operation circuit configured to perform a logical operation on the plurality of second signals or a plurality of third signals that varies in a manner that depends on the plurality of second signals and generate a fourth signal including a result of the logical operation; and a counter configured to count a value relating to the plurality of first signals based on the fourth signal, wherein each of the plurality of state detection circuits has an input terminal to which the fourth signal is input, and input of each of the plurality of first signals to a corresponding one of the plurality of state detection circuits is disabled based on the fourth signal input to the input terminal.

2. The APD sensor according to claim 1, further comprising:

a first substrate including a pixel array region having the plurality of pixels; and a second substrate bonded to the first substrate, the second substrate including the plurality of state detection circuits, the logical operation circuit, and the counter.

3. The APD sensor according to claim 2, wherein the plurality of state detection circuits and at least a part of the logical operation circuit is disposed so as to face the pixel array region, and the counter is disposed so as not to face the pixel array region or is disposed in the pixel array region.

4. The APD sensor according to claim 2, wherein the plurality of state detection circuits is disposed so as to face the pixel array region, and at least a part of the logical operation circuit and the counter are disposed so as not to face the pixel array region.

5. The APD sensor according to claim 1, wherein the APD is a single photon avalanche diode (SPAD).

6. The APD sensor according to claim 1, wherein the APD has a cathode electrically connected to a corresponding one of the plurality of state detection circuits.

7. The APD sensor according to claim 1, wherein the APD has an anode electrically connected to a corresponding one of the plurality of state detection circuits.

8. The APD sensor according to claim 1, wherein the input terminal is a reset terminal configured to reset a corresponding one of the plurality of state detection circuits.

9. The APD sensor according to claim 1, wherein the plurality of state detection circuits each detect an edge of a corresponding one of the plurality of first signals.

10. The APD sensor according to claim 1, wherein each of the plurality of state detection circuits includes a flip-flop circuit.

11. The APD sensor according to claim 10, wherein each of the plurality of first signals is input to a clock terminal of the flip-flop circuit.

12. The APD sensor according to claim 1, wherein each of the plurality of state detection circuits is configured to detect a level of a corresponding one of the plurality of first signals.

13. The APD sensor according to claim 1, wherein each of the plurality of state detection circuits includes a latch circuit.

14. The APD sensor according to claim 13, wherein each of the plurality of state detection circuits further includes an AND circuit or a NAND circuit configured to perform an AND operation or a NAND operation on two signals obtained from a corresponding one of the plurality of first signals, and inputs a signal indicating a result of the AND operation or the NAND operation to the latch circuit.

15. The APD sensor according to claim 1, wherein the logical operation circuit includes a plurality of transistors configured to generate the plurality of third signals based on the plurality of second signals.

16. The APD sensor according to claim 15, wherein each of the plurality of second signals is input to a control terminal of a corresponding one of the plurality of transistors, and each of the plurality of third signals is output from a main terminal of a corresponding one of the plurality of transistors.

17. The APD sensor according to claim 1, wherein the fourth signal includes a result of an AND operation, an OR operation, a NAND operation, or a NOR operation on the plurality of second signals or the plurality of third signals.

18. The APD sensor according to claim 1, wherein the logical operation circuit includes a wired AND circuit, a wired OR circuit, a wired NAND circuit, or a wired NOR circuit.

19. The APD sensor according to claim 1, wherein the logical operation circuit includes at least one of an AND gate, an OR gate, a NAND gate, or a NOR gate.

20. A ranging system comprising:

a light emitting device configured to irradiate a subject with light;

a light receiving device configured to receive light reflected off the subject; and a ranging device configured to measure a distance to the subject based on the light received by the light receiving device, wherein the light receiving device includes:

a plurality of pixels each including an avalanche photodiode (APD), the APD being configured to receive the light reflected off the subject;

a plurality of state detection circuits configured to detect states of a plurality of first signals output from the plurality of pixels and generate a plurality of second signals including detection results of the states of the plurality of first signals;

a logical operation circuit configured to perform a logical operation on the plurality of second signals or a plurality of third signals that varies in a manner that depends on the plurality of second signals and generate a fourth signal including a result of the logical operation; and a counter configured to count a value relating to the plurality of first signals based on the fourth signal, each of the plurality of state detection circuits has an input terminal to which the fourth signal is input, and input of each of the plurality of first signals to a corresponding one of the plurality of state detection circuits is disabled based on the fourth signal input to the input terminal.

* * * * *